(12) United States Patent
Sugizaki

(10) Patent No.: US 6,975,431 B1
(45) Date of Patent: Dec. 13, 2005

(54) IMAGE PROCESSING METHOD AND IMAGE PROCESSING APPARATUS

(75) Inventor: Makoto Sugizaki, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 810 days.

(21) Appl. No.: 09/690,755

(22) Filed: Oct. 18, 2000

(30) Foreign Application Priority Data

Oct. 18, 1999 (JP) ............................ 11-295391

(51) Int. Cl.[7] .................. G06K 15/00; H04N 1/405
(52) U.S. Cl. .................. 358/3.06; 358/1.9; 358/3.01
(58) Field of Search ...................... 358/1.9, 2.99, 358/3.01, 3.06, 3.13, 3.14, 3.21, 3.22, 406, 358/504, 534, 535, 536

(56) References Cited

U.S. PATENT DOCUMENTS 4,507,685 A * 3/1985 Kawamura ............... 358/536

* cited by examiner

Primary Examiner—Thomas D. Lee
(74) Attorney, Agent, or Firm—Sughrue Mion, PLLC

(57) ABSTRACT

There are disclosed an image processing method of performing a process for converting image data representative of pixel values of a plurality of pixels constituting an image into image data representative of dot patterns of halftone dots, and an image processing apparatus for performing such a processing. A super cell is adopted in which a plurality of dot patterns are combined in such a manner that the contact of the adjacent dot patterns occurs gradually in some dot % range but not simultaneously in some dot %.

25 Claims, 22 Drawing Sheets

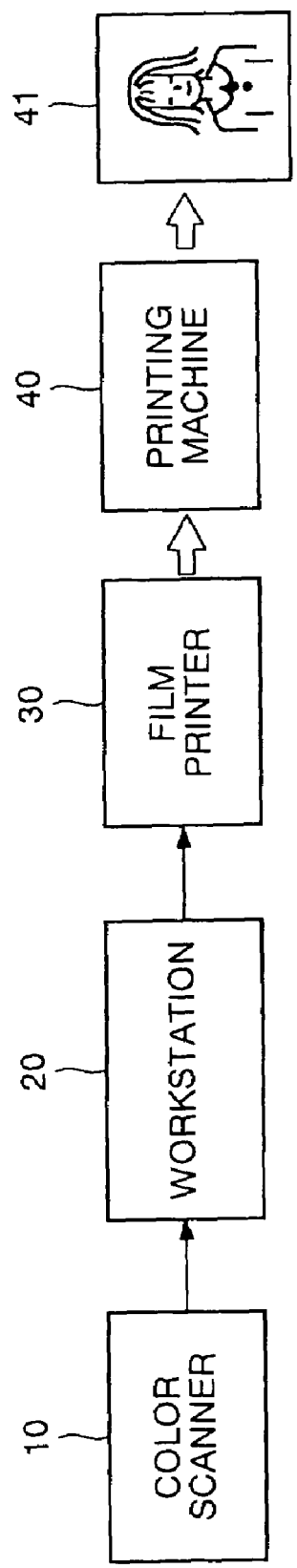

Fig. 2(A)

| 25 | 19 | 12 | 18 | 23 |
|----|----|----|----|----|
| 20 | 7  | 3  | 8  | 17 |
| 13 | 4  | 1  | 5  | 11 |
| 21 | 9  | 2  | 6  | 16 |
| 22 | 14 | 10 | 15 | 24 |

Fig. 2(B)

| 14 | 14 | 14 | 14 | 14 | 14 | 14 |
|----|----|----|----|----|----|----|
| 14 | 14 | 14 | 14 | 14 | 14 | 14 |
| 14 | 14 | 14 | 14 | 14 | 14 | 14 |
| 14 | 14 | 14 | 14 | 14 | 14 | 14 |
| 14 | 14 | 14 | 14 | 14 | 14 | 14 |
| 14 | 14 | 14 | 14 | 14 | 14 | 14 |
| 14 | 14 | 14 | 14 | 14 | 14 | 14 |

Fig. 2(C)

| 0 | 0 | 1 | 0 | 0 | 0 | 0 |
|---|---|---|---|---|---|---|
| 0 | 1 | 1 | 1 | 0 | 0 | 1 |
| 1 | 1 | 1 | 1 | 1 | 1 | 1 |
| 0 | 1 | 1 | 1 | 0 | 0 | 1 |
| 0 | 0 | 1 | 0 | 0 | 0 | 0 |
| 0 | 0 | 1 | 0 | 0 | 0 | 0 |
| 0 | 1 | 1 | 1 | 0 | 0 | 1 |

Fig. II

IMAGE PROCESSING METHOD AND IMAGE PROCESSING APPARATUS

BACKGROUND OF THE INVENTION

1. Field of the Invention

The present invention relates to an image processing method of performing a process for converting image data (pixel value data) representative of pixel values of a plurality of pixels constituting an image into image data (halftone dot data) representative of dot patterns of halftone dots for a halftone dot image output, and an image processing apparatus for performing such a processing.

2. Description of the Related Art

Hitherto, there are used a printing machine and some color printers to form a halftone dot image in accordance with the halftone dot data.

To produce the halftone dot data in accordance with which a halftone dot image is formed, for example, image data (pixel value data) representative of pixel values of a plurality of pixels constituting an image is converted into image data (halftone dot data) representative of dot patterns of halftone dots in such a manner that when a halftone pattern comprising an array of thresholds is superimposed on the image, the pixel values of the pixels on the image are compared with the thresholds of the halftone pattern, and the pixel values of the pixels on the image are converted into multi-values (typically binary values).

Hereinafter, there will be described more in detail a process of producing of the halftone dot data referring to an example in which a printing machine is used to output a halftone dot image.

FIG. 1 is a block diagram showing an example of a printing system.

A color scanner 10 reads an original image to generate color separation image data for four colors of CMYK representative of the original image thus read. The image data for four colors of CMYK is fed to a workstation 20. In the workstation 20, an operator performs an electronic page make-up in accordance with an input image. When the electronic page make-up is completed, image data (pixel value data) representative of the image after the page make-up is generated, and the pixel value data is converted into halftone dot data for printing in a manner as will be described later. The halftone dot data is fed to a film printer 30 to produce a printing film original plate consisting of plates for CMYK associated with the entered halftone dot data.

A printing plate is produced from the printing film original plate, and then mounted on a printing machine 40. Ink is applied to the printing plate mounted on the printing machine 40. The ink thus applied is transferred to a printing paper so that a halftone dot image 41 is formed on the printing paper.

A conversion of the pixel value data into the halftone dot data in the workstation 20 is performed as follows.

FIGS. 2(A)–2(C) are explanatory views useful for understanding a conversion method of converting the pixel value data into the halftone dot data.

FIG. 2(A) is an illustration showing an example of a halftone pattern in which thresholds are arranged on a two-dimensional basis. In this halftone pattern, there are arranged the thresholds of values 1 to 25 as shown in FIG. 2(A).

FIG. 2(B) is an illustration showing part of image data (pixel value data) before the conversion, wherein there is shown a uniform image in which all pixels have pixel value 14.

Here, the image of FIG. 2(B) is partitioned into domains each having the same area as the halftone pattern of FIG. 2(A), and the halftone pattern of FIG. 2(A) is superimposed on each domain, so that the pixel value of each pixel on the image is compared with the associated threshold on the halftone pattern. When the pixel value is smaller than the threshold, the pixel value is converted into the value '0', and when the pixel value is larger than the threshold, the pixel value is converted into the value '1', and as a result, there is produced a binary image as shown in FIG. 2(C). Here, ink is applied to pixels of '1' of FIG. 2(C) (a pattern, to which the ink is applied, is referred to as a dot pattern), while no ink is applied to pixels of '0' of FIG. 2(C). That is, in FIG. 2(C), there is formed a dot pattern of a halftone dot on the same size of the halftone pattern of FIG. 2(A).

As seen from the arrangement of thresholds constituting the halftone pattern of FIG. 2(A), when pixel values of pixels constituting the image shown in FIG. 2(B) are small, the dot pattern for each halftone dot is of small area. As the pixel values of the pixels are larger, the area of the dot pattern for each halftone dot is expanded and thereby increasing density of the halftone dot image. As the pixel values of pixels are further larger, the dot patterns of the adjacent halftone dot are coupled with one another, and finally, there is formed a so-called solid image in which ink is applied to all the pixels of the whole halftone dots.

Incidentally, the halftone pattern shown in FIG. 2(A) forms a halftone dot in its entirety. The halftone pattern corresponding to the one halftone dot, or as shown in FIG. 3, when a halftone pattern corresponds to a plurality of halftone dots, a portion corresponding to a halftone dot of the whole halftone pattern, is referred to as a dot cell.

FIG. 3 is a view showing an example of a halftone pattern.

In the halftone pattern shown in FIG. 3, a plurality of dots are diagonally arranged. The halftone pattern is scanned vertically and horizontally in its entirety in such a manner that the halftone pattern is sequentially superimposed on areas of an image, so that a halftone dot image, in which halftone dots are diagonally arranged, is formed. The reason why the halftone dots are diagonally arranged is that occurrence of moirèis prevented by means of changing an angle of the arrangement for each color ink.

The halftone pattern is arranged by a combination of a plurality of dot cells. The halftone pattern, in which the plurality of dot cells are arranged, is referred to as a super-cell. The adoption of the super-cell makes it possible to perform a high speed scan.

Thus, the workstation 20 shown in FIG. 1 converts image data (pixel value data) representative of pixel values of a plurality of pixels constituting an image into image data (halftone dot data) representative of dot patterns of halftone dots. When image density represented by an area of the dot pattern on image data (halftone dot data) after conversion is not coincident with density of a halftone dot image obtained by performing actually printing in accordance with the halftone dot data. For example, when pixel values of a plurality of pixels constituting an image are sequentially varied from a small value (corresponding to low density) to a large value (corresponding to high density), the image density, which is computed from the dot pattern on the halftone dot data, is continuously varied; nevertheless, when printing is performed actually in accordance with the halftone dot data, the image density is varied discontinuously on the printed halftone dot image (such a discontinuous variation of image density is referred to as a tone jump). In some printed image, the discontinuity in density is visually recognized, and thus this brings about a problem that an image quality of the printed image is lowered.

SUMMARY OF THE INVENTION

In view of the foregoing, it is an object of the present invention to provide an image processing method capable of removing or reducing the discontinuity in density as compared with the prior art, and also to provide an image processing apparatus for performing such a processing.

To achieve the above-mentioned object, the present invention provides an image processing method of performing a halftone dot processing in which first image data representative of pixel values of a plurality of pixels constituting an image is converted into second image data representative of dot patterns of halftone dots, wherein said image processing method performs the halftone dot processing in which a first dot % of dot patterns, wherein mutually contacting dot patterns first appear with respect to an identical direction on the image, in the event that the halftone dot processing is repeatedly performed while pixel values of pixels on an image comprising a plurality of pixels all of which are same in pixel value are sequentially varied from a lower density end to a higher density end uniformly, is different from a second dot % of dot patterns wherein all the dot patterns, which are adjacent to one another with respect to the identical direction, are in contact with one another.

Here, it is noted that the above-referenced description "in the event that the halftone dot processing is repeatedly performed while pixel values of pixels on an image comprising a plurality of pixels all of which are same in pixel value are sequentially varied from a lower density end to a higher density end uniformly" is an expression for association of the pixel values with the first dot % and the second dot %, but it does not mean that the uniform image is actually prepared, and the pixel values of pixels on the image are varied in such a manner.

In the image processing method according to the present invention as mentioned above, it is preferable that said halftone dot processing is a process for comparing pixel values of pixels on an image represented by the first image data with thresholds of a halftone pattern comprising an arrangement of thresholds, which are mutually superimposed, in the event that the halftone pattern is superimposed on the image, to convert the pixel values of the respective pixels on the image into binary values or multi-values more than the binary values, and said halftone dot processing is performed using a halftone pattern in which thresholds are adjusted in such a manner that the first dot % regarding a same direction on the image is different from the second dot %, said halftone pattern being concerned with such a pattern that when a dot cell associated with one halftone dot is regarded as a unit, there are arranged a plurality of sorts of dot cells in which at least part of thresholds arranged on the dot cells are relatively different from pixel values on an image area on which the dot cells are superimposed.

Here the above-referenced description "a plurality of sorts of dot cells in which at least part of thresholds arranged on the dot cells are relatively different from pixel values on an image area on which the dot cells are superimposed" typically means that thresholds are different among the plurality of sorts of dot cells. However, the thresholds of the dot cells are relative to the pixel values. Thus, it is acceptable that the pixel values to be compared with the thresholds arranged on the dot cells are corrected while the thresholds of the dot cells are fixed.

Further, the above-referenced description "halftone pattern . . . there are arranged a plurality of sorts of dot cells" means that it brings about a result that a halftone pattern using a plurality of sorts of dot cells. For example, before comparison of pixel values of pixels on an image with thresholds of a halftone pattern, a halftone (referred to as a super cell), wherein a plurality of sorts of dot cells are arranged, is produced beforehand, and it is acceptable that such a super cell is used to scan the image. Alternatively, it is acceptable that a plurality of sorts of dot cells are used on an alternate basis (in case of two sorts) or on a circular basis (in case of three sorts) to scan the image, and as a result, it is equivalent to that there is used a halftone pattern wherein a plurality of sorts of dot cells are arranged. Further, according to the present invention, there is no need to perform a scanning, it is acceptable to use a halftone pattern having the same area as an image when it is represented by the number of pixels, wherein a plurality of sorts of dot cells are arranged.

Ratio of an area of a dot pattern within a halftone dot to an area of the halftone dot is referred to dot %. When the dot % is gradually increased (a pixel value of an image is gradually varied from the lower density end to the higher density end so that an area of the dot pattern is gradually expanded), dot patterns of the adjacent halftone dots are in contact with one another on a certain dot %. At that time, on the image actually printed, ink is expanded up to the broader area than a contacting point of the dot patterns on the contacting point. This causes a tone jump to occur. In case of a printing system for producing a film negative for printing, the tone jump occurs also owing to expansion of an exposure beam for producing the film negative for printing. As the dot pattern of the halftone dot, there are known several halftone dot configurations such as a square halftone dot, an elliptical halftone dot and the like, in accordance with a decision of thresholds shown in FIG. 2(A). For example, in case of a square halftone dot, when the dot % is gradually increased, four points of a dot pattern are simultaneously in contact with dot patterns of the adjacent halftone dots. In case of an elliptical halftone dot, when the dot % is gradually increased, two points of a dot pattern with respect to the same direction are simultaneously in contact with dot patterns of the adjacent halftone dots. Tone jump occurs at the dot % on which the contact occurs. For the purpose of the solution of this problem, with respect to the square halftone dot, there is proposed a technology in which contact of two points by two points is given by providing difference of 2% or more of dot % (Japanese Patent No. 2578947), but not four points simultaneous contact. However, in this case also, a simultaneous contact of two points by two points occurs on a number of halftone dots, and thus there is a high possibility that the tone jump occurs.

In view of the foregoing, according to the image processing method of the present invention, the first dot % is different from the second dot % with respect to the same direction. Thus, it is possible to obtain a high quality of halftone dot image involving almost no occurrence of a tone jump or being not conspicuous in a tone jump as compared with the prior art.

In the image processing method according to the present invention as mentioned above, it is preferable that said halftone dot processing is performed in such a manner that the first dot % of dot patterns, wherein mutually contacting dot patterns first appear with respect to an identical direction on the image, in the event that the halftone dot processing is repeatedly performed while pixel values of pixels on an image comprising a plurality of pixels all of which are same in pixel value are sequentially varied from a lower density end to a higher density end uniformly, is different from the second dot % of dot patterns wherein all the dot patterns, which are adjacent to one another with respect to the identical direction, and further the first dot %-to-first dot % with respect to the mutually different direction, and the second dot %-to-second dot % with respect to the mutually different direction are mutually different, respectively.

In this case, it is acceptable that said halftone dot processing is a process for comparing pixel values of pixels on an image represented by the first image data with thresholds of a halftone pattern comprising an arrangement of thresholds, which are mutually superimposed, in the event that the halftone pattern is superimposed on the image, to convert the pixel values of the respective pixels on the image into binary values or multi-values more than the binary values, and said halftone dot processing is performed using a halftone pattern in which thresholds are adjusted in such a manner that the first dot %-to-first dot % with respect to the mutually different direction, and the second dot %-to-second dot % with respect to the mutually different direction are mutually different, respectively, said halftone pattern being concerned with such a pattern that when a dot cell associated with one halftone dot is regarded as a unit, there are arranged a plurality of sorts of dot cells in which at least part of thresholds arranged on the dot cells are relatively different from pixel values on an image area on which the dot cells are superimposed.

This feature makes it possible to obtain a high quality of halftone dot image further suppressing occurrence of a tone jump.

In the image processing method according to the present invention as mentioned above, it is acceptable that said halftone dot processing is performed using a halftone pattern in which there are arranged a plurality of sorts of dot cells for forming dot patterns, which are identical with one another in growth process with respect to the shape and are different from one another in degree of growth in at least part of mean dot % range, in the event that the halftone dot processing is repeated while pixel values on the image are sequentially varied from the lower density end to the higher density end uniformly. Alternatively, it is acceptable that said halftone dot processing is performed using a halftone pattern in which there are arranged a plurality of sorts of dot cells for forming dot patterns, which grow while maintaining the same dot % and are mutually different with respect to the shape in at least part of dot % range, in the event that the halftone dot processing is repeated while pixel values on the image are sequentially varied from the lower density end to the higher density end uniformly.

In the image processing method according to the present invention as mentioned above, it is preferable that said halftone dot processing is performed using a halftone pattern in which there are arranged a plurality of sorts of dot cells wherein there are arranged thresholds which are relatively adjusted to pixel values of the image area to be superimposed in such a manner that a difference between minimum dot % of the first dot % regarding mutually different directions and maximum dot % of the second dot % regarding mutually different directions is not less than 1%.

This feature makes it possible to effectively suppress the tone jump.

According to the image processing method of the present invention as mentioned above, typically, the halftone pattern is used to convert pixel values of pixels of an image into the binary values. However, it is acceptable that pixel values of pixels of an image are converted into the multi-values, for example, the ternary values.

Further, in the image processing method of the present invention as mentioned above, to detect the first dot % and the second dot %, it is acceptable that it is detected as to whether the dot patterns are in contact with one another on the second image data, so that the first dot % and the second dot % are detected. Alternatively, it is acceptable that the halftone dot image is outputted, and it is detected as to whether the dot patterns are in contact with one another on the halftone dot image, so that the first dot % and the second dot % are detected.

To achieve the above-mentioned objects of the present invention, there is provided a first image processing apparatus for performing a halftone dot processing in which first image data representative of pixel values of a plurality of pixels constituting an image is converted into second image data representative of dot patterns of halftone dots, said image processing apparatus comprising:

a data conversion unit for comparing pixel values of pixels on an image represented by said first image data with a threshold of halftone patterns comprising an arrangement of thresholds, which are mutually superimposed, in the event that the halftone patterns are superimposed on the image, to convert the pixel values of the respective pixels on the image into multi-values not less than binary values, so that the second image data representative of dot patterns of the respective halftone dots is produced; and a halftone pattern storage unit for storing the halftone patterns in which thresholds are adjusted so as to obtain dot patterns wherein a first dot % of dot patterns, wherein mutually contacting dot patterns first appear with respect to the same direction on the image, in the event that the halftone pattern is concerned with such a halftone pattern that when a dot cell associated with one halftone dot is regarded as a unit, there are arranged a plurality of sorts of dot cells in which at least part of thresholds arranged on the dot cell is different from among dot cells, and in addition in the event that the data conversion unit repeatedly performs the data conversion processing, using the halftone patterns, while the pixel values of the pixels on the image comprising a plurality of pixels all of which are same in pixel value are sequentially varied from the lower density end to the higher density end uniformly, is different from a second dot % of dot patterns wherein all the dot patterns, which are adjacent to one another with respect to the same direction, are in contact with one another, wherein said data conversion unit performs the data conversion processing using the halftone patterns stored in said halftone pattern storage unit.

In the first image processing apparatus according to the present invention as mentioned above, it is preferable that said halftone pattern storage unit stores the halftone patterns in which thresholds are adjusted so as to obtain dot patterns wherein a first dot % of dot patterns, wherein mutually contacting dot patterns first appear with respect to the same direction on the image, in the event that the halftone pattern is concerned with such a halftone pattern that when a dot cell associated with one halftone dot is regarded as a unit, there are arranged a plurality of sorts of dot cells in which at least part of thresholds arranged on the dot cell is different from among dot cells, and in addition in the event that the data conversion unit repeatedly performs the data conversion processing, using the halftone patterns, while the pixel values of the pixels on the image comprising a plurality of pixels all of which are same in pixel value are sequentially varied from the lower density end to the higher density end uniformly, is different from a second dot % of dot patterns wherein all the dot patterns, which are adjacent to one another with respect to the same direction, are in contact with one another, said halftone patterns being a pattern in which thresholds are adjusted in such a manner that mutually different dot patterns are obtained as to the first dot %-to-first dot % with respect to the mutually different direction, and as to the second dot %-to-second dot % with respect to the mutually different direction.

A second image processing apparatus adopt a scheme in which pixel values, instead of using a plurality of dot cells in which thresholds are different, are converted into a plurality of sorts of patterns.

That is, there is provided a second image processing apparatus for performing a halftone dot processing in which first image data representative of pixel values of a plurality of pixels constituting an image is converted into second image data representative of dot patterns of halftone dots, said image processing apparatus comprising:

a data correction unit for performing an arithmetic operation between pixel values of pixels on an image represented by said first image data and correction values of a correction pattern comprising an arrangement of correction values, which are mutually superimposed, in the event that the correction pattern is superimposed on the image, to correct the pixel values of the respective pixels on the image, so that there is executed a data correction processing for generating third image data representative of pixel values after correction of a plurality of pixels constituting the image; and a data conversion unit for comparing pixel values of pixels on an image represented by the third image data generated in said data correction unit with a threshold of a halftone pattern comprising an arrangement of thresholds, which are mutually superimposed, in the event that the halftone pattern is superimposed on the image, to convert the pixel values of the respective pixels on the image into multi-values not less than binary values, so that second image data representative of dot patterns of the respective halftone dots is generated, wherein said data conversion unit performs the data correction processing using a correction pattern in which correction values are adjusted so as to obtain dot patterns wherein a first dot % of dot patterns, wherein mutually contacting dot patterns first appear with respect to the same direction on the image, in the event that the correction pattern is concerned with such a correction pattern that when a correction cell associated with one halftone dot is regarded as a unit, there are arranged a plurality of sorts of correction cells in which at least part of correction values arranged on the correction cell is different from among correction cells, and in addition in the event that the data correction processing by said data correction unit and the data conversion processing by said data conversion unit are repeatedly performed while the pixel values of the pixels on the image comprising a plurality of pixels all of which are same in pixel value are sequentially varied from the lower density end to the higher density end uniformly, is different from a second dot % of dot patterns wherein all the dot patterns, which are adjacent to one another with respect to the same direction, are in contact with one another.

In the second image processing apparatus according to the present invention as mentioned above, it is preferable that said data conversion unit performs the data correction processing using a correction pattern in which correction values are adjusted so as to obtain dot patterns wherein a first dot % of dot patterns, wherein mutually contacting dot patterns first appear with respect to the same direction on the image, in the event that the correction pattern is concerned with such a correction pattern that when a correction cell associated with one halftone dot is regarded as a unit, there are arranged a plurality of sorts of correction cells in which at least part of correction values arranged on the correction cell is different from among correction cells, and in addition in the event that the data correction processing by said data correction unit and the data conversion processing by said data conversion unit are repeatedly performed while the pixel values of the pixels on the image comprising a plurality of pixels all of which are same in pixel value are sequentially varied from the lower density end to the higher density end uniformly, is different from a second dot % of dot patterns wherein all the dot patterns, which are adjacent to one another with respect to the same direction, are in contact with one another, said correction pattern being a pattern in which correction values are adjusted in such a manner that mutually different dot patterns are obtained also as to the first dot %-to-first dot % with respect to the mutually different direction, and the second dot %-to-second dot % with respect to the mutually different direction.

According to the image processing apparatus of the present invention, the first image data representative of pixel values of pixels of the image is converted into the second image data representative of the dot pattern, which is involved in almost no occurrence of the tone jump or being not conspicuous in the tone jump.

BRIEF DESCRIPTION OF THE DRAWINGS

FIG. 1 is a block diagram showing an example of a printing system.

FIGS. 2(A)–2(C) are explanatory views useful for understanding a conversion method of converting the pixel value data into the halftone dot data.

DETAILED DESCRIPTION OF PREFERRED EMBODIMENTS

Embodiments of the present invention will be described with reference to the accompanying drawings.

Figure 4:
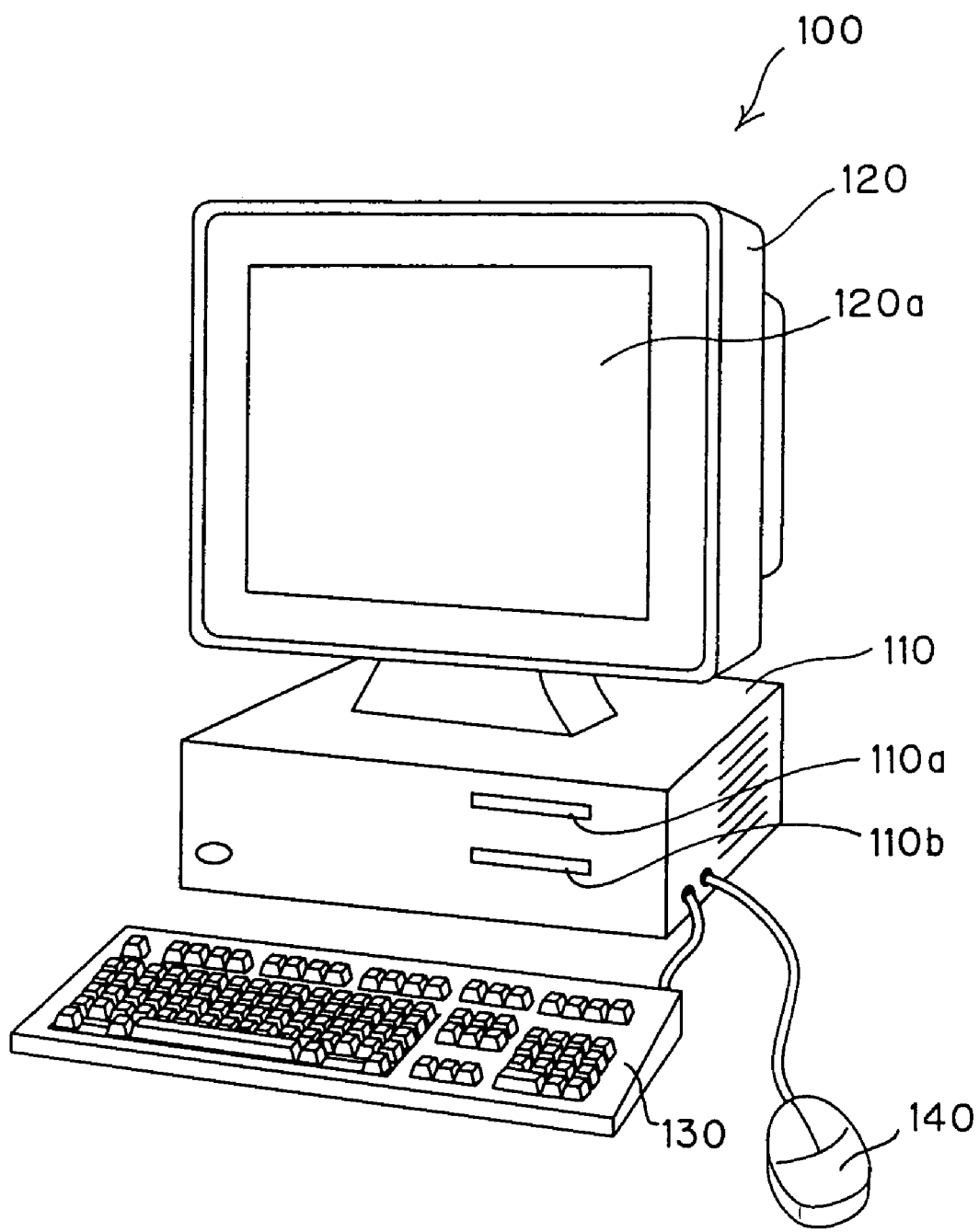
FIG. 4 is a perspective view of a personal computer.
Figure 5:
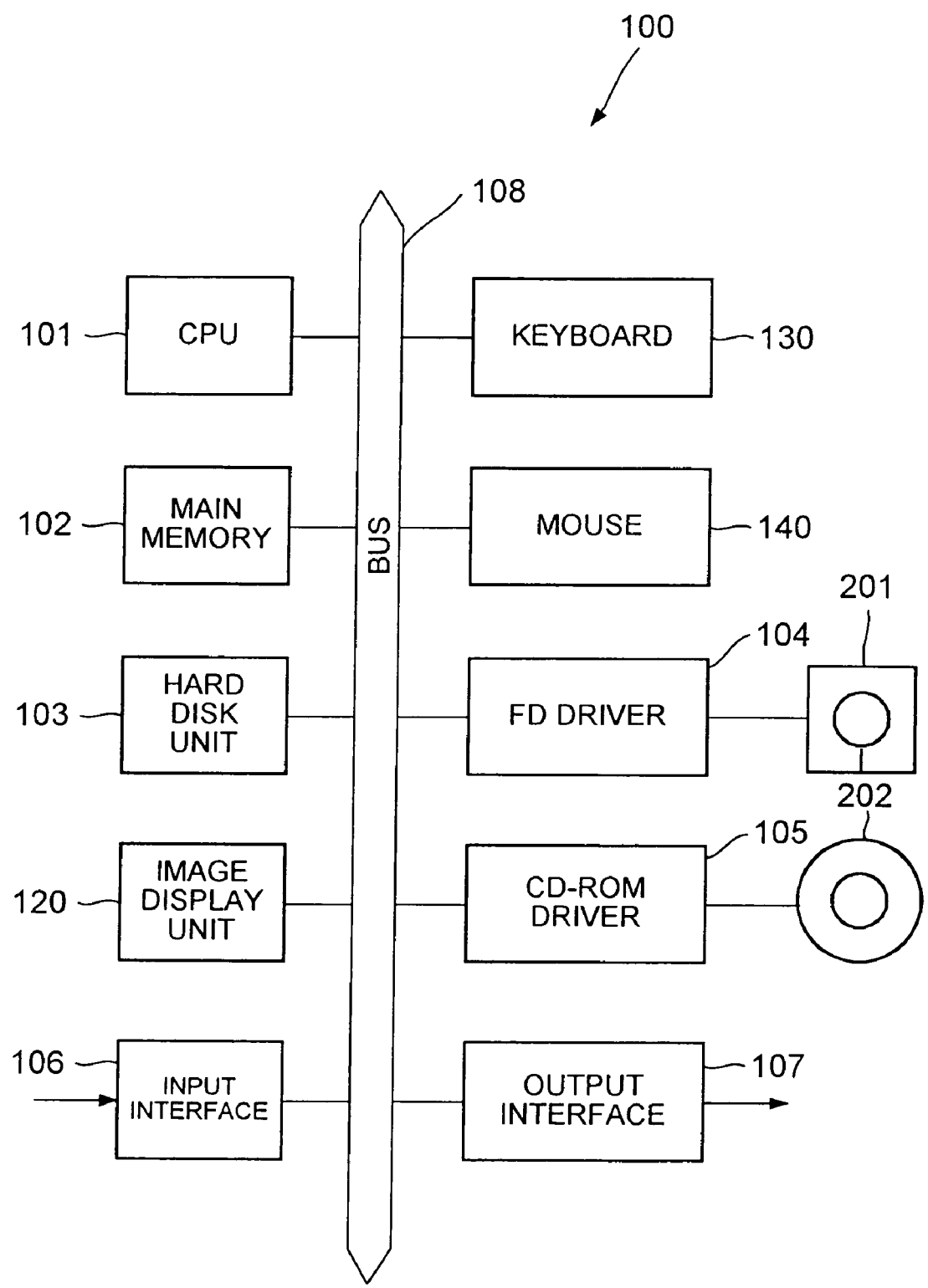
FIG. 5 is a hardware structural view of a personal computer.

FIG. 4 is a perspective view of a personal computer. FIG. 5 is a hardware structural view of the personal computer.

A personal computer 100 corresponds to the workstation 20 in the printing system shown in FIG. 1. The personal computer 100 converts first image data (pixel value data) representative of pixel values of a plurality of pixels constituting an image into second image data (halftone dot data) representative of dot patterns of halftone dots of a halftone dot image.

The personal computer 100 comprises, on an external appearance, a main frame unit 110, an image display unit 120 for displaying an image on a display screen 120a in accordance with an instruction from the main frame unit 110, a keyboard 130 for inputting various sorts of information to the main frame unit 110 in accordance with a key operation, and a mouse 140 for inputting an instruction according to, for example, an icon and the like, through designation of an optional position on the display screen 120a, the icon and the like being displayed on the position on the display screen 120a. The main frame unit 110 has a floppy disk mounting slot 110a for mounting a floppy disk, and a CD-ROM mounting slot 110b for mounting a CD-ROM.

The main frame unit 110 comprises, as shown in FIG. 5, a CPU 101 for executing a various types of program, a main memory 102 in which a program stored in a hard disk unit 103 is read out and developed for execution by the CPU 101, the hard disk unit 103 for saving various types of programs and data, an FD driver 104 for accessing a floppy disk 201 mounted thereon, a CD-ROM driver 105 for accessing a CD-ROM 202 mounted thereon, an input interface 106 connected to the color scanner 10 (cf. FIG. 1) to receive image data from the color scanner 10, and an output interface 107 connected to the film printer 30 (cf. FIG. 1) to transmit halftone dot data to the film printer 30. These various types of elements are connected via a bus 108 to the image display unit 120, the keyboard 130 and the mouse 140.

The CD-ROM 202 stores therein an image processing program for causing the personal computer 100 to operate as an image processing apparatus. The CD-ROM 202 is mounted on the CD-ROM driver 105 so that the image processing program, which is stored in the CD-ROM 202, is up-loaded on the personal computer 100 and is stored in the hard disk unit 103. The image processing program stored in the hard disk unit 103 is developed on the main memory 102, and is executed by the CPU 101. Thus, the personal computer 100 is operated as an image processing apparatus.

Next, there will be explained an image processing method according to an image processing program to be executed by the personal computer 100.

Figure 6:
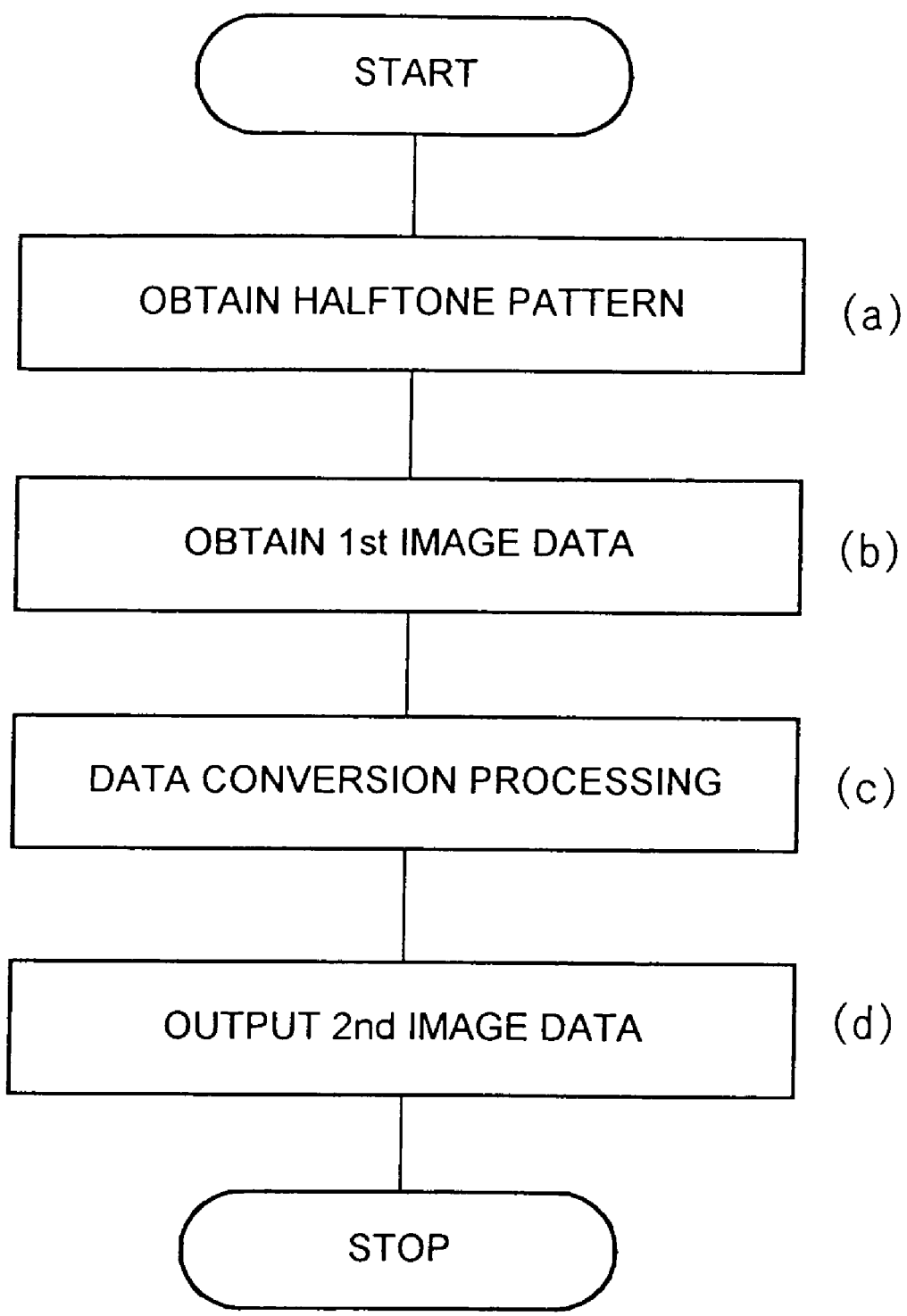
FIG. 6 is a flowchart useful for understanding an image processing method according to an image processing program to be executed in a personal computer.

FIG. 6 is a flowchart useful for understanding an image processing method according to an image processing program to be executed in the personal computer shown in FIGS. 4 and 5. Here, first image data (pixel value data) representative of pixel values of a plurality of pixels constituting an image into second image data (halftone dot data) representative of dot patterns of halftone dots of a halftone dot image.

Figure 3:
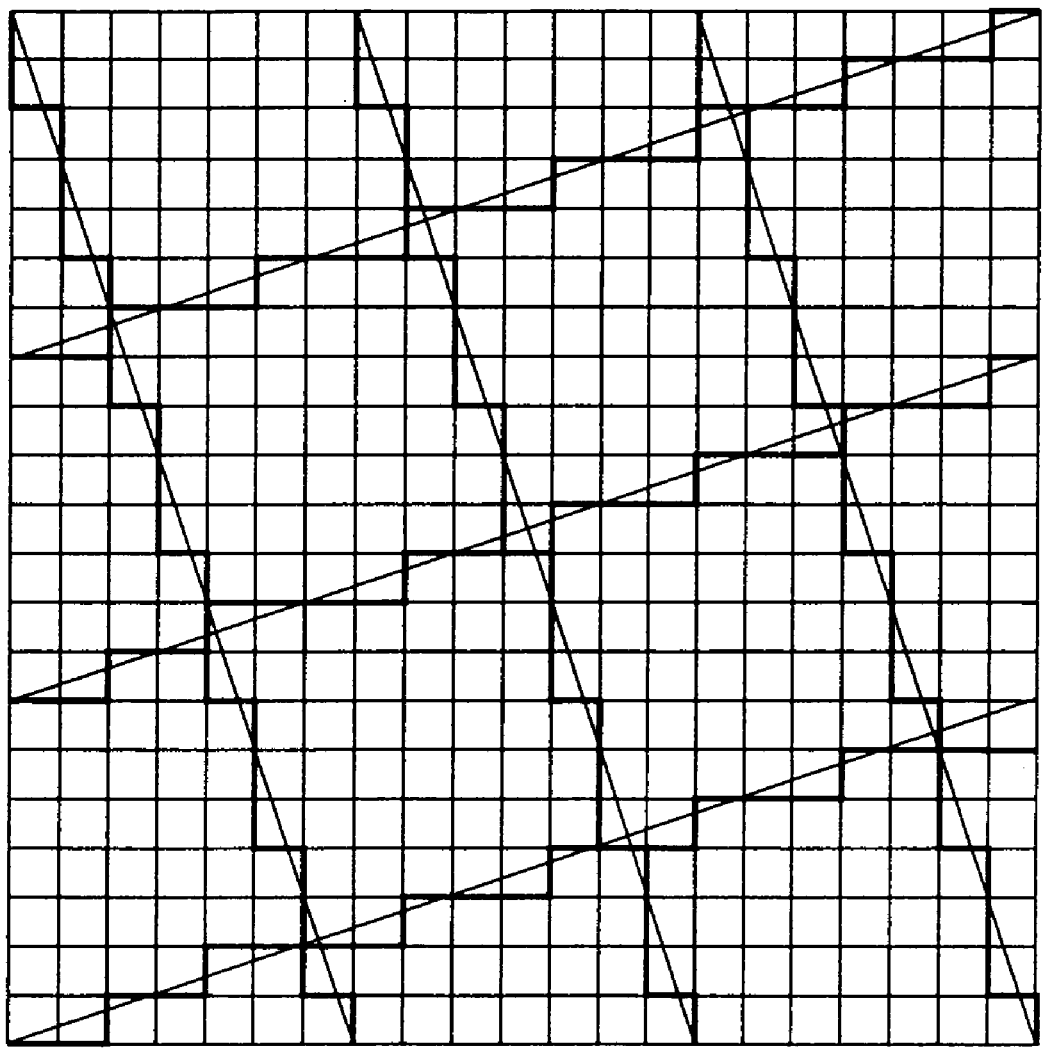
FIG. 3 is a view showing an example of a halftone pattern.

First, in step (a), a halftone pattern is obtained. In FIG. 2(A) and FIG. 3, there is shown an example of the halftone pattern. In the step (a), as will be described later, there is obtained a halftone pattern consisting of a plurality sorts of dot cells which are mutually different in threshold at least in part. It is acceptable that this halftone pattern is a halftone pattern consisting of a plurality of sorts of dot cells produced in accordance with a plurality of sorts of basic patterns, such as a basic pattern in accordance with which dot cells for forming a square halftone dot is produced, and a basic pattern in accordance with which dot cells for forming a elliptical halftone dot is produced, or alternatively it is acceptable that this halftone pattern is a halftone pattern consisting of a plurality of sorts of dot cells produced in such a manner that thresholds of a sort of basic pattern are altered.

In step (b), a first image data is obtained. Here, an original image is read by the color scanner 10 shown in FIG. 1, and after the workstation 20 (the personal computer 100) is used to perform an electronic page make-up, the workstation 20 (the personal computer 100) produces a first image data (pixel value data) representative of pixel values of a plurality of pixels constituting a printing image. Alternatively, it is acceptable that such a first image data (pixel value data) is produced outside the personal computer 100 and the first image data (pixel value data) thus produced is fed to the personal computer 100.

In step (c), the pixel value data (the first image data) is converted into the halftone dot data (a second image data).

The conversion method has been explained per se referring to FIG. 2, and thus the redundant explanation will be omitted.

In step (d), the halftone dot data (the second image data) is outputted to the film printer 30. As mentioned above, the film printer 30 produces a printing film original plate in accordance with the entered halftone dot data.

Next, there will be explained the effect of the present embodiment in comparison with the effect of the comparative example.

Figure 7:
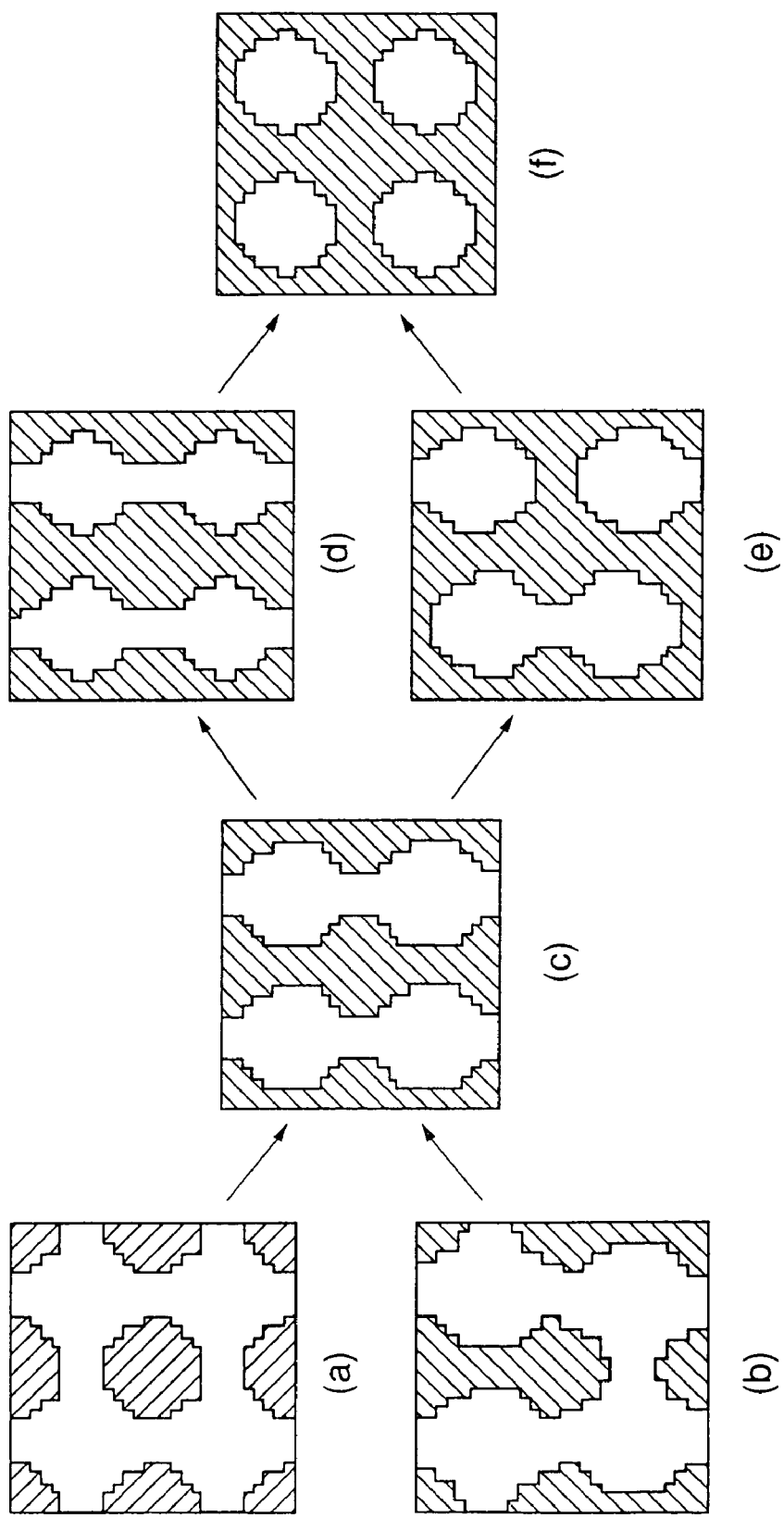
FIG. 7 is an illustration useful for understanding both the effect of the present embodiment and the effect of the comparative example.

FIG. 7 is an illustration useful for understanding both the effect of the present embodiment and the effect of the comparative example.

In FIG. 7, shaded portions are dot patterns to which ink is applied at the time of printing, and halftone dots are arranged in vertical and horizontal directions of the figure.

When pixel values are sequentially varied throughout the overall surface of an image from a smaller value of the low density end to a larger value of the high density end, areas of the dot patterns are sequentially expanded, so that the dot patterns are varied as (part(a), part(b))→part(c)→(part(d), part(e))→part(f) of FIG. 7.

Here, parts (a) (c) (d) (f) of FIG. 7 show variation of the dot patterns regarding the comparative example. As seen from FIG. 7, from the state that dot patterns are separated as a land, as shown in part (a) of FIG. 7, the dot patterns adjacent with respect to the vertical direction, as shown in part (c) of FIG. 7, are simultaneously connected with one another, and thereafter, as shown in part (d) of FIG. 7, the dot patterns are further expanded, and finally, as shown in part (f) of FIG. 7, the dot patterns adjacent with respect to the horizontal direction are simultaneously connected with one another. Ink is expanded over the broader area than the connecting points in the event that the adjacent dot patterns are connected. Thus, a tone jump occurs.

Parts (b)→(c)→(e)→(f) of FIG. 7 show variation of the dot patterns regarding the present embodiment. When areas of dot patterns are sequentially expanded, first, as shown in part (b) of FIG. 7, each of the dot patterns is connected with only one of two dot patterns which are adjacent to one another with respect to the vertical direction, and after the areas of the dot patterns are further expanded, as shown in part (c) of FIG. 7, each of the dot patterns is connected with another of the two dot patterns which are adjacent to one another with respect to the vertical direction. Here, there is provided dot % difference of 8% between the state shown in part (b) of FIG. 7 and the state shown in part (c) of FIG. 7.

When the areas of the dot patterns are further expanded, as shown in part (e) of FIG. 7, each of the dot patterns is connected with only one of two dot patterns which are adjacent to one another with respect to the horizontal direction, and after the areas of the dot patterns are further expanded, as shown in part (f) of FIG. 7, each of the dot patterns is connected with another of the two dot patterns which are adjacent to one another with respect to the horizontal direction. Here, there is provided dot % difference of 8% between the state shown in part (e) of FIG. 7 and the state shown in part (f) of FIG. 7.

According to the present embodiment, as shown in the flow of parts (b)→(c)→(e)→(f) of FIG. 7, there is adopted a halftone pattern comprising a plurality of sorts of basic patterns in which thresholds are adjusted in such a manner that the number of connecting points to be simultaneously connected is reduced and connecting points are sequentially connected, and the halftone pattern is converted into halftone dot data representative of a halftone dot image which is hard to be conspicuous in tone jump.

In order to obtain the halftone dot image which is hard to be conspicuous in tone jump, it is preferable that there exists dot % difference of 1% or more between dot % (for example, the state of part (b) of FIG. 7) wherein a contact of the adjacent dot patterns appears first and dot % (for example, the state of part (f) of FIG. 7) wherein all the adjacent dot patterns contact with one another. The reason why this is to do so is that even in a case where the contact of the adjacent dot patterns occurs sequentially but not simultaneously, there is a possibility that the tone jump is conspicuous when the dot % difference is less than 1%.

Figure 8:
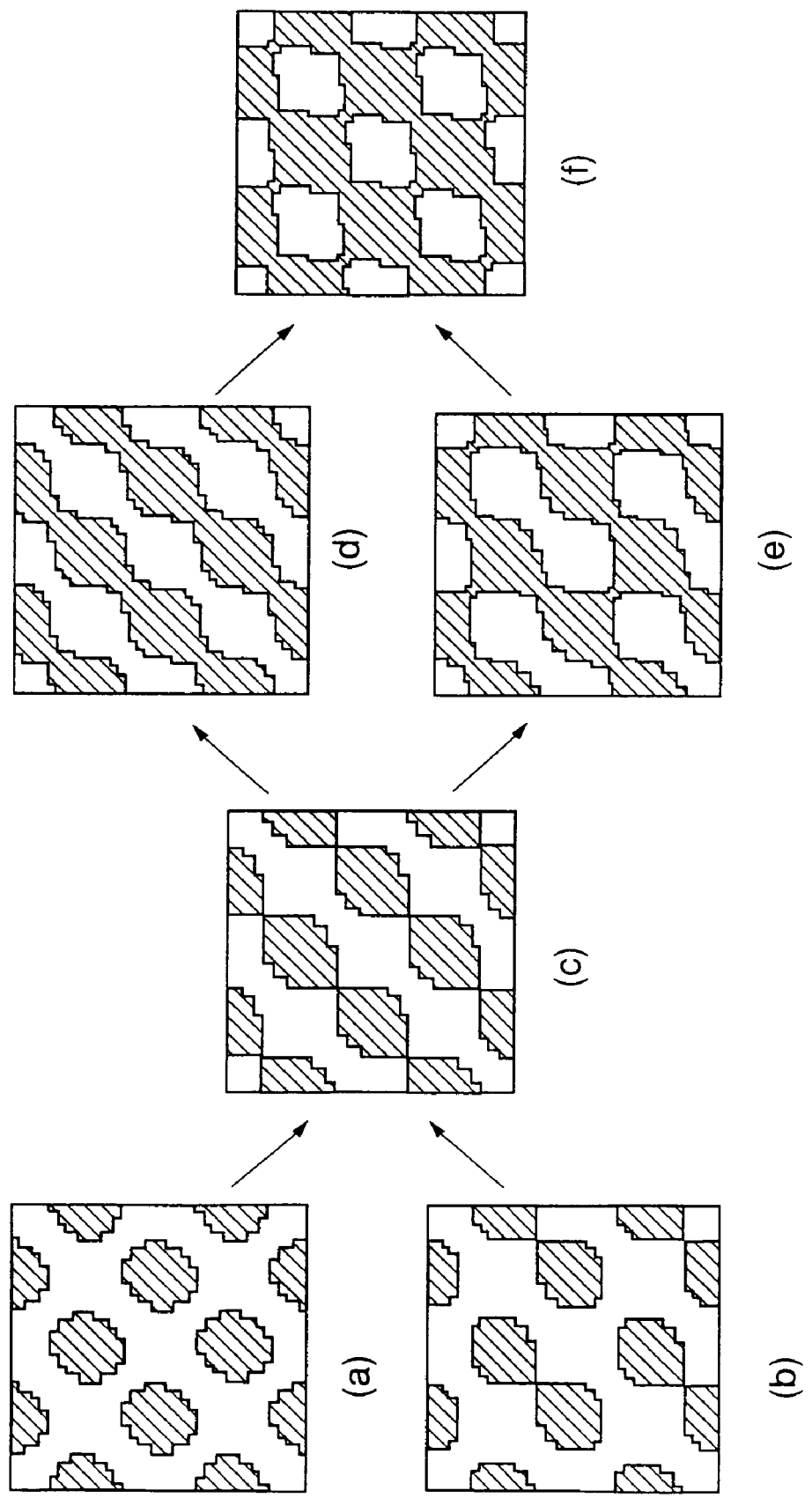
FIG. 8 is an alternative illustration useful for understanding both the effect of the present embodiment and the effect of the comparative example.

FIG. 8 is an alternative illustration useful for understanding both the effect of the present embodiment and the effect of the comparative example. Also in FIG. 8, similar to FIG. 7, the shaded portions are dot patterns. Incidentally, in FIG. 8, halftone dots are arranged diagonally.

In a similar fashion to that of FIG. 7, when pixel values are sequentially varied throughout the overall surface of an image from a smaller value of the low density end to a larger value of the high density end, areas of the dot patterns are sequentially expanded, so that the dot patterns are varied as (part(a), part(b))→part(c)→(part(d), part(e))→part(f) of FIG. 8.

Here, parts (a)→(c)→(d)→(f) of FIG. 8 show variation of the dot patterns regarding the comparative example. As seen from FIG. 8, from the state that dot patterns are separated as a land, as shown in part (a) of FIG. 8, when the dot patterns are expanded, the dot patterns adjacent with respect to the direction coupling the upper right to the lower left, as shown in part (c) of FIG. 8, are simultaneously connected with one another, and thereafter, as shown in part (d) of FIG. 8, the dot patterns coupled in the diagonal direction are further expanded, and finally, as shown in part (f) of FIG. 8, the dot patterns adjacent with respect to the direction coupling the upper left to the lower right are simultaneously connected with one another. Ink is expanded over the broader area than the connecting points in the event that the adjacent dot patterns are connected. Thus, a tone jump occurs.

Parts (b)→(c)→(e)→(f) of FIG. 8 show variation of the dot patterns regarding the present embodiment. When areas of dot patterns are sequentially expanded, first, as shown in part (b) of FIG. 8, the dot patterns, which are aligned in a direction coupling the upper right to the lower left, are connected every other dot pattern with one of two dot patterns which are adjacent to one another with respect to the direction coupling the upper right to the lower left, and after the areas of the dot patterns are further expanded, as shown in part (c) of FIG. 8, all the dot patterns are connected with one another with respect to the direction coupling the upper right to the lower left. When the areas of the dot patterns are further expanded, as shown in part (e) of FIG. 8, the dot patterns are connected every other dot pattern with one of two dot patterns which are adjacent to one another with respect to the direction coupling the upper left to the lower right, and after the areas of the dot patterns are further expanded, as shown in part (f) of FIG. 8, all the dot patterns are connected with one another with respect to the direction coupling the upper left to the lower right. Here, also in case of FIG. 8, in a similar fashion to that of FIG. 7, there is provided dot % difference of 8% between the state shown in part (e) of FIG. 8 and the state shown in part (f) of FIG. 8. In this manner, there is adopted a basic pattern in which thresholds are adjusted in such a manner that connecting points are sequentially connected and the number of connecting points to be simultaneously connected is reduced. This feature makes it possible to obtain a halftone dot image which is hard to be conspicuous in tone jump.

Incidentally, also in case of FIG. 8, in a similar fashion to that of FIG. 7, even if the halftone dots are arranged diagonally, in order to obtain the halftone dot image which is hard to be conspicuous in tone jump, it is preferable that there exists dot % difference of 1% or more between dot % (for example, the state of part (b) of FIG. 8) wherein a contact of the adjacent dot patterns appears first and dot % (for example, the state of part (f) of FIG. 8) wherein all the adjacent dot patterns contact with one another.

Figure 9:
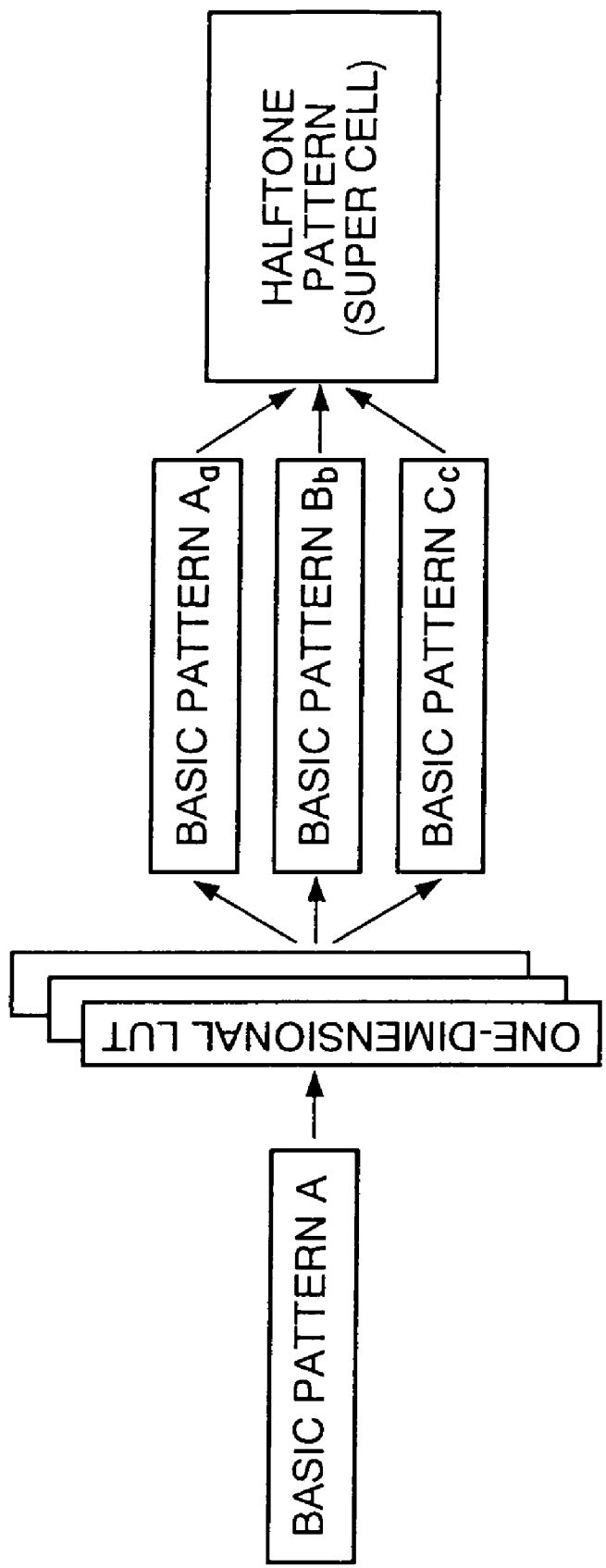
FIG. 9 is an explanatory view useful for understanding a method of producing a plurality of sorts of basic patterns from a sort of basic pattern.
Figure 10:
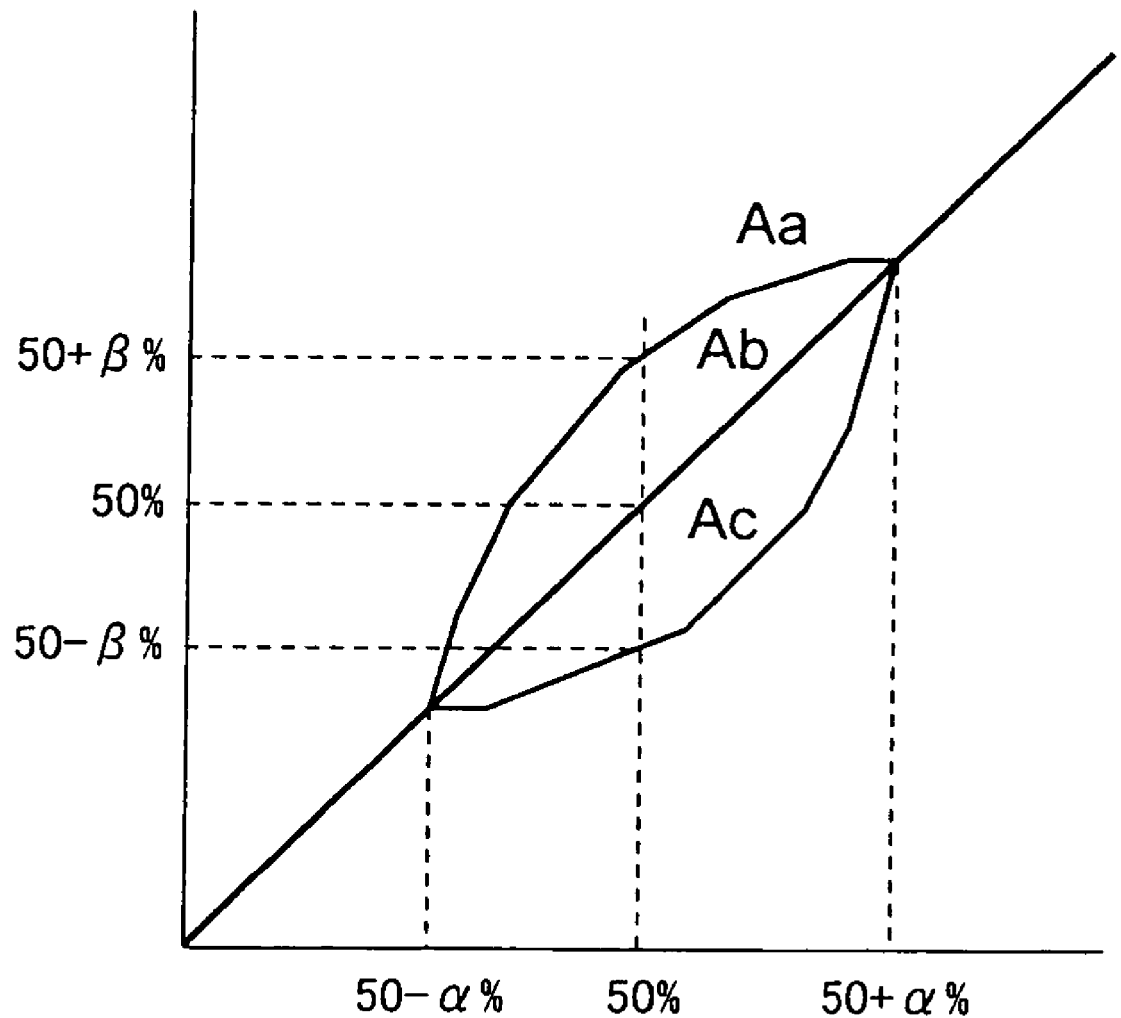
FIG. 10 is an explanatory view useful for understanding a one-dimensional LUT shown in FIG. 9.
Figure 11:
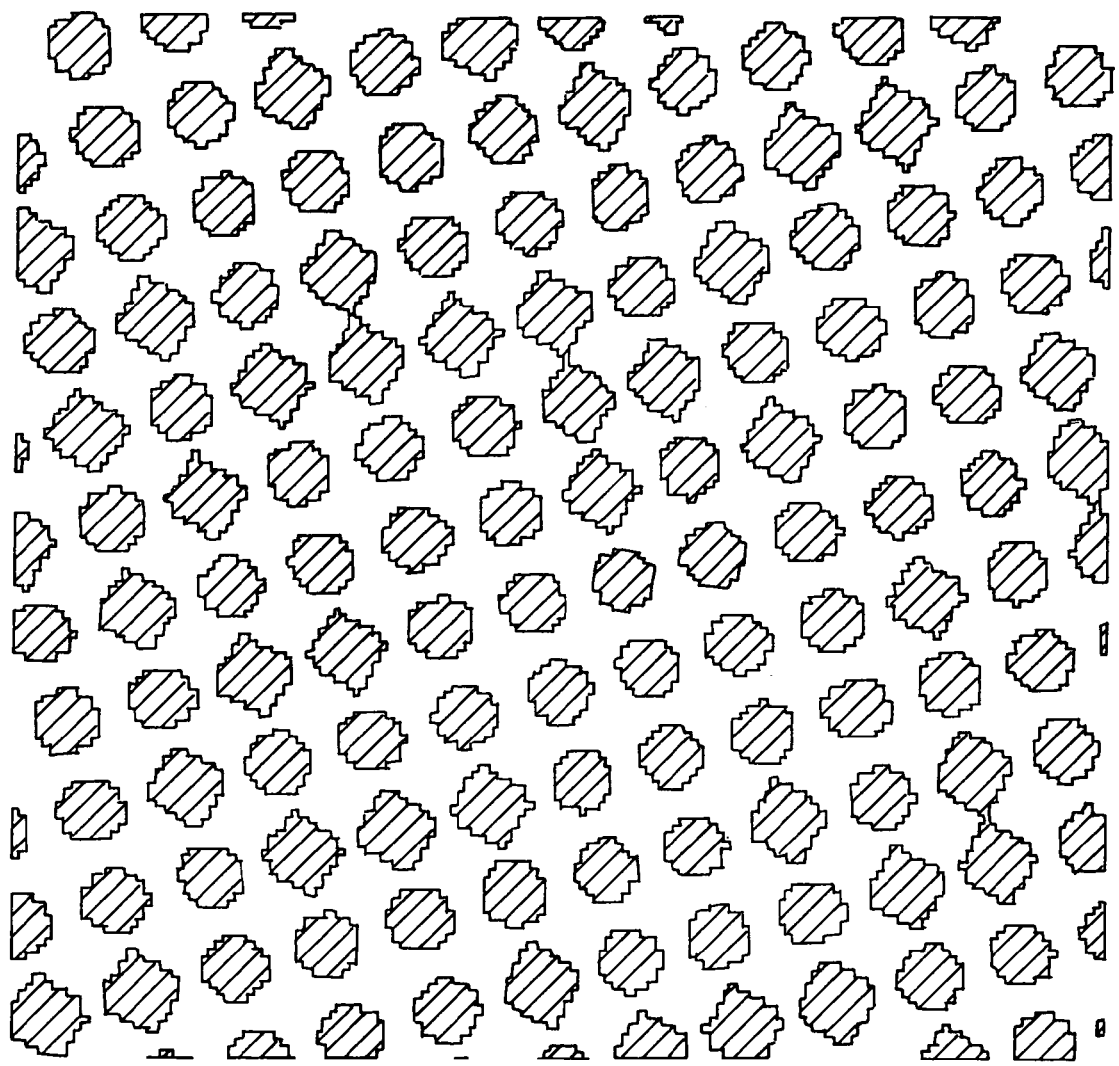
FIG. 11 is a view showing a distribution of a dot pattern wherein mean dot % is 41% in the event that pixel values are varied uniformly using the method explained referring to FIGS. 9 and 10.
Figure 12:
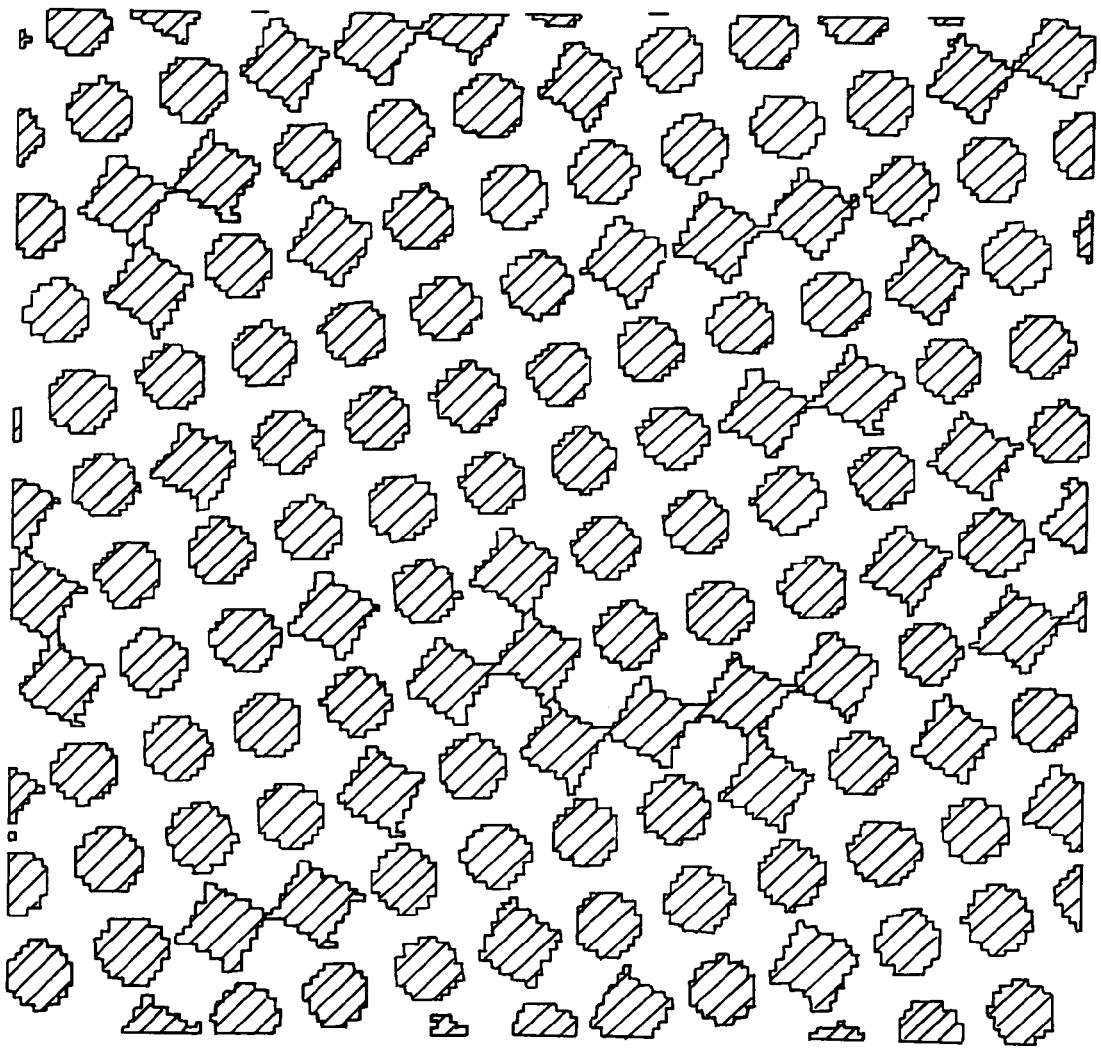
FIG. 12 is a view showing a distribution of a dot pattern wherein mean dot % is 44% in the event that pixel values are varied uniformly using the method explained referring to FIGS. 9 and 10.
Figure 13:
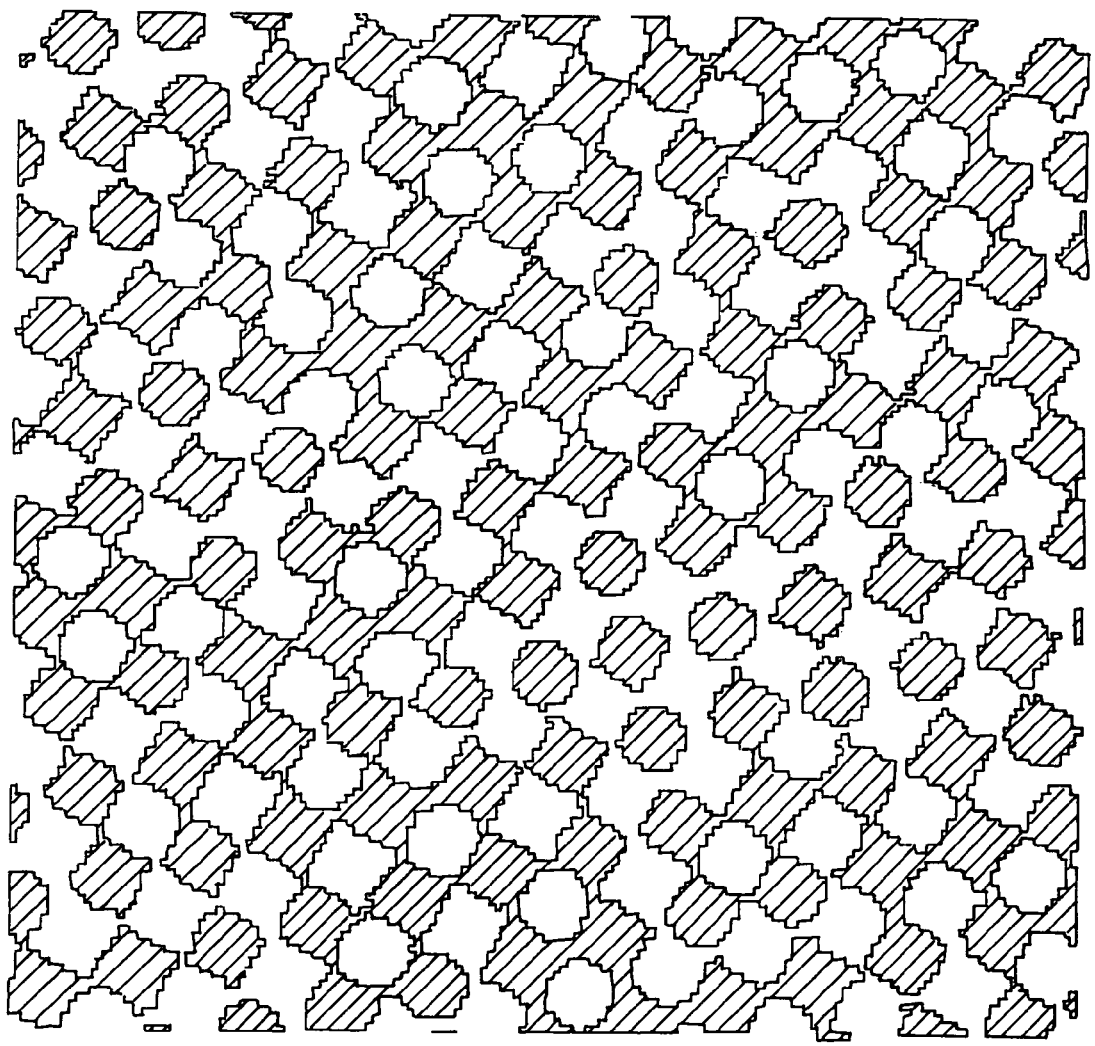
FIG. 13 is a view showing a distribution of a dot pattern wherein mean dot % is 50% in the event that pixel values are varied uniformly using the method explained referring to FIGS. 9 and 10.
Figure 14:
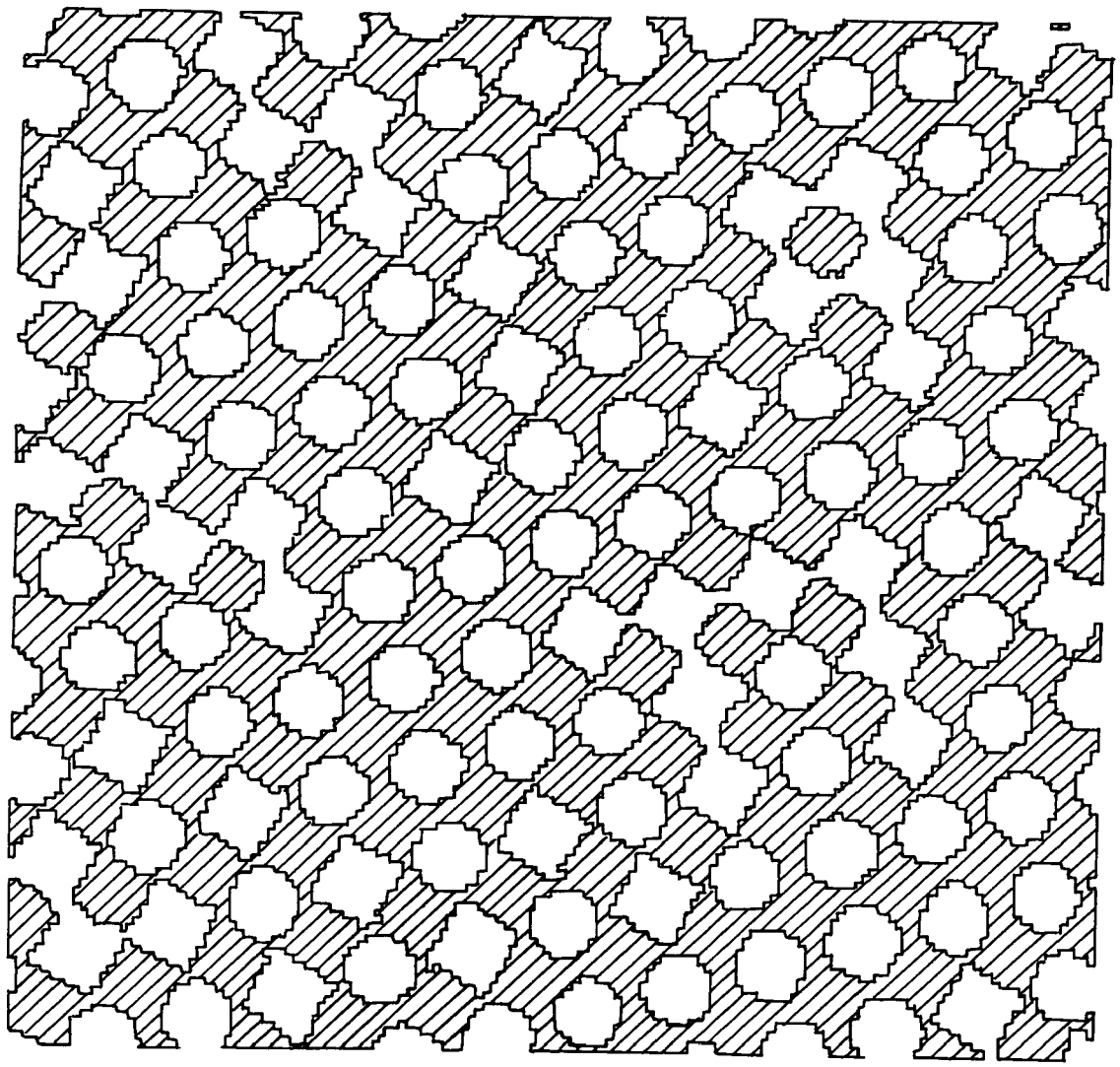
FIG. 14 is a view showing a distribution of a dot pattern wherein mean dot % is 55% in the event that pixel values are varied uniformly using the method explained referring to FIGS. 9 and 10.
Figure 15:
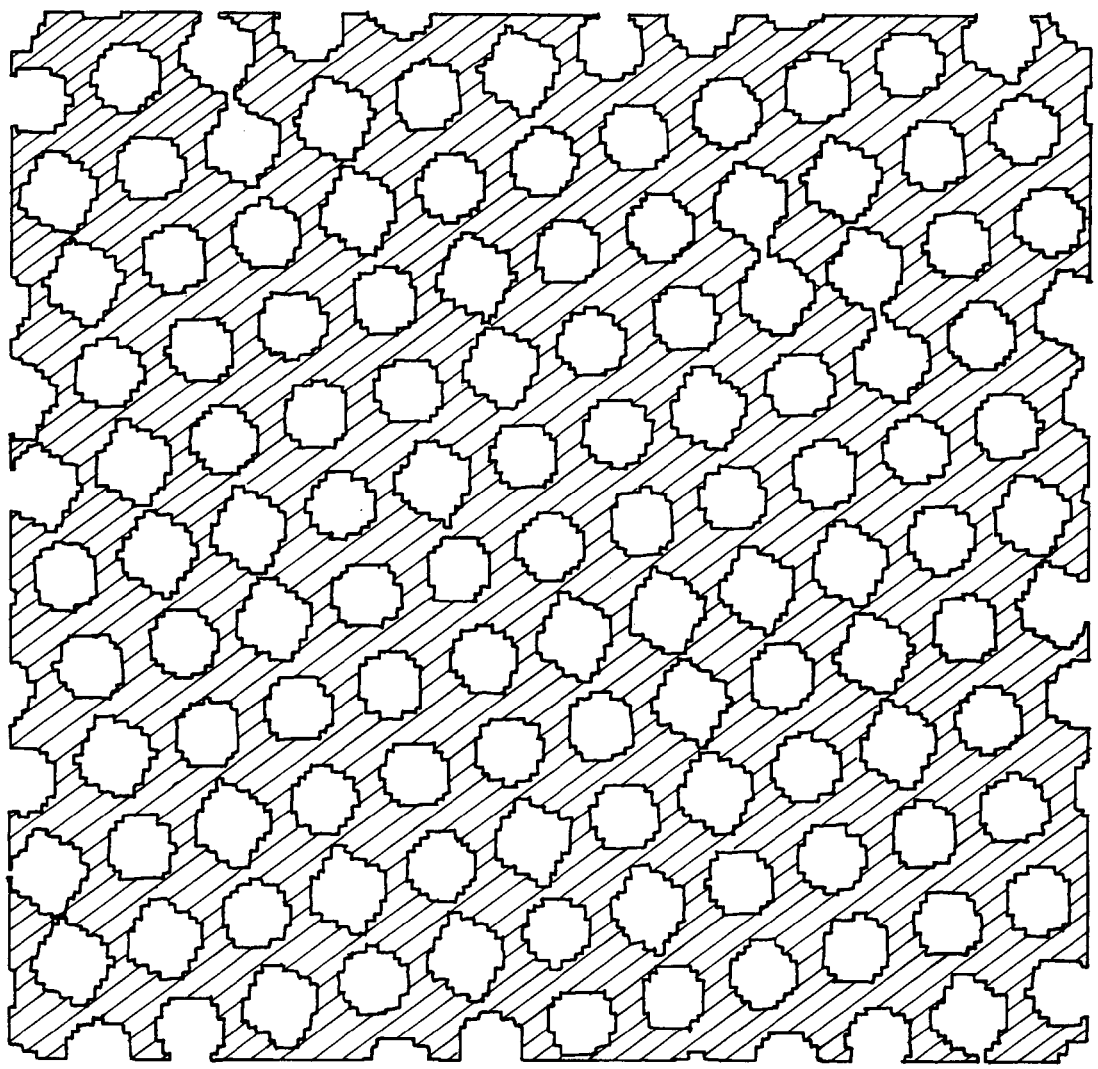
FIG. 15 is a view showing a distribution of a dot pattern wherein mean dot % is 59% in the event that pixel values are varied uniformly using the method explained referring to FIGS. 9 and 10.

FIG. 9 is an explanatory view useful for understanding a method of producing a plurality of sorts of basic patterns from a sort of basic pattern. FIG. 10 is an explanatory view useful for understanding a one-dimensional LUT (Look-up table) shown in FIG. 9.

Here, assuming that a sort of basic pattern A (for example, FIG. 2(A)) exists first, the basic pattern A is converted into a plurality of sorts of basic patterns (here three sorts of basic patterns) $A_a$, $A_b$, $A_c$ referring to a one-dimensional LUT (Look-up table).

The one-dimensional LUT comprises three one-dimensional LUTs for converting thresholds along three curved lines (including a straight line) shown in FIG. 10 to produce new three sorts of basic patterns, respectively. Each one-dimensional LUT converts the basic pattern A into three sorts of basic patterns $A_a$, $A_b$, $A_c$ along three curved lines shown by the curved lines $A_a$, $A_b$, $A_c$ in FIG. 10.

That is, here, when it is assumed that the original basic pattern A before the conversion has a configuration wherein the adjacent dot patterns come in contact with one another at dot % of 5%, the one-dimensional LUT converts the basic pattern A into the basic patterns $A_a$, $A_b$, $A_c$ in which thresholds are adjusted in such a manner that the adjacent dot patterns come into contact with one another when the original basic pattern A is concerned with 50+β%, 50%, 50−β% in dot %. The three basic patterns $A_a$, $A_b$, $A_c$ thus converted form dot patterns which are identical with one another in growth process with respect to the shape, but are mutually different from one another in degree of the growth, in the range of 50−α% to 50+α%, when pixel values on an image are sequentially varied from the lower density end to the higher density end uniformly.

Here, those three sorts of basic patterns $A_a$, $A_b$, $A_c$ are combined to form a super cell comprising a plurality of sorts of dot cells. In the event that such a super cell is used to sequentially form dot patterns while pixels of the image in its entirety are varied in their pixel value from the smaller one to the larger one sequentially, the dot patterns converted through the use of any of three basic patterns $A_a$, $A_b$, $A_c$ are identical with one another in their growth process and also always identical with one another in degree of their growth, within an area of the pixel value not more than the pixel value wherein in a dot pattern is formed in accordance with the original basic pattern before the conversion, the dot pattern thus formed (this is referred to as the original dot pattern) is 50−α% in dot %. When the original dot pattern) exceeds 50−α% in dot %, a degree of growth is varied according as the dot pattern is converted in accordance with which one of three basic patterns $A_a$, $A_b$, $A_c$. A growth of the dot pattern involved in the conversion using the basic patterns $A_c$ is fastest, and a growth of the dot pattern involved in the conversion using the basic patterns $A_a$ is slowest. In case of the original basic pattern A, when dot % is 50%, the adjacent dot patterns are in contact with one another. Thus, with respect to the dot patterns involved in the conversion using the basic patterns $A_c$, the dot patterns adjacent to one another wherein dot % is 50−β% are in contact with one another, with respect to the dot patterns involved in the conversion using the basic patterns $A_b$, the dot patterns adjacent to one another wherein dot % is 50% are in contact with one another, and with respect to the dot patterns involved in the conversion using the basic patterns $A_a$, the dot patterns adjacent to one another wherein dot % is 50+β% are in contact with one another.

When the pixel value is further increased and it reaches a pixel value wherein there is formed the dot patterns involved in 50+α% through conversion using the original basic pattern A, the dot patterns converted through the use of any of three basic patterns $A_a$, $A_b$, $A_c$ are identical with one another in dot % (50+α%) and also identical with one another in their shape. Thereafter, when the pixel value is furthermore increased, the dot patterns converted through the use of any of three basic patterns $A_a$, $A_b$, $A_c$ are identical with one another in their growth process and also identical with one another in degree of their growth.

In this manner, on a predetermined dot % range (50−α% to 50+α%), there are produced from an original basic pattern a plurality of sorts (here, three types) of basic patterns, which are mutually different from one another in degree of their growth in one dot % (an average dot % of a plurality of dot patterns obtained through the use of a plurality of sorts of basic patterns $A_a$, $A_b$, $A_c$), while they are identical with one another in their growth process, and the plurality of sorts of basic patterns are combined to produce a super cell comprising a plurality of sorts of dot cells. The super cell thus produced is used to convert image data (pixel value data) representative of pixel values into image data (halftone dot data) representative of dot patterns of halftone dots. This feature makes it possible to provide a dispersion for dot % involved in connection of the adjacent dot patterns. For example, according to the examples shown in FIGS. 9 and 10, dot % involved in connection of the adjacent dot patterns is dispersed to width of (50+β%)−(50−β%)=2β%.

The curve $A_a$ shown in FIG. 10 is a quadratic curve determined in such a manner that it passes through, for example, three points of (50α, 50−α), (50, 50+β) (50+α, 50+α), and the curve $A_c$ shown in FIG. 10 is a quadratic curve determined in such a manner that it passes through, for example, three points of (50−α, 50−α), (50, 50−β), (50+α, 50+α). The one-dimensional LUTs shown in FIG. 9 are produced in such a manner that the basic patterns $A_a$, $A_c$ are obtained from the original basic pattern A along those quadratic curves. Incidentally, according to the present embodiment, the basic pattern $A_b$ is the original basic pattern A itself, and thus the one-dimensional LUT associated with this conversion serves to convert nothing and outputs the original itself.

FIGS. 11–15 are views each showing a distribution of a dot pattern of the respective mean dot % in the event that pixel values are varied uniformly using the method explained referring to FIGS. 9 and 10.

In those figures, shaded portions denote dot patterns. Here, there is used such a method that pixel values of pixels of an image are converted using a super pixel wherein there are arranged a plurality of sorts of basic patterns for forming dot patterns, which are identical with one another in growth process with respect to the shape and are different from one another in degree of growth in at least part of mean dot % range, in the event that processing for a conversion of pixel values into dot patterns is repeated while pixel values on the image are sequentially varied from the lower density end to the higher density end uniformly.

FIGS. 11–15 show distributions of dot patterns of 41%, 44%, 50%, 55% and 59% in mean dot %, respectively.

As seen from those figures, when the pixel values are varied from the lower density end to the higher density end, contacting points are gradually increased, but a plurality of dot patterns are not in contact with one another simultaneously at a large number of points. The adoption of such a super cell makes it possible to obtain a high quality of halftone dot image involving no occurrence of a tone jump or being not conspicuous in a tone jump.

Figure 16:
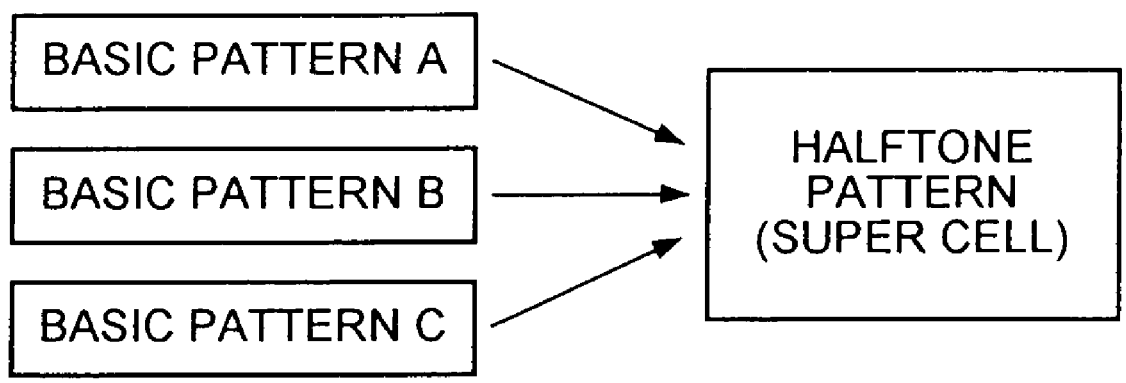
FIG. 16 is an explanatory view useful for understanding an alternative embodiment of a method of producing a halftone pattern according to the present invention.

FIG. 16 is an explanatory view useful for understanding an alternative embodiment of a method of producing a halftone pattern according to the present invention.

Here, there are prepared a plurality of sorts (here three sorts) of basic patterns A, B and C for forming dot patterns which are mutually different in shape, for example, a rectangular form, an elliptical form and so on, even if they are identical to one another in dot %. Those plurality of sorts of basic patterns A, B and C are combined to produce a super cell comprising a plurality of sorts of dot cells. While dot patterns are identical to one another in dot %, when the dot patterns are different in shape, dot % wherein the adjacent dot patterns are in contact with one another are different. In this manner, a combination of the basic patterns, which are originally different from one another in sort, also makes it possible to expand a range of dot % wherein the adjacent dot patterns are in contact with one another, so that the adjacent dot patterns come in contact with one another little by little. Thus, it is possible to obtain a high quality of halftone dot image involving no occurrence of a tone jump or being not conspicuous in a tone jump.

Figure 17:
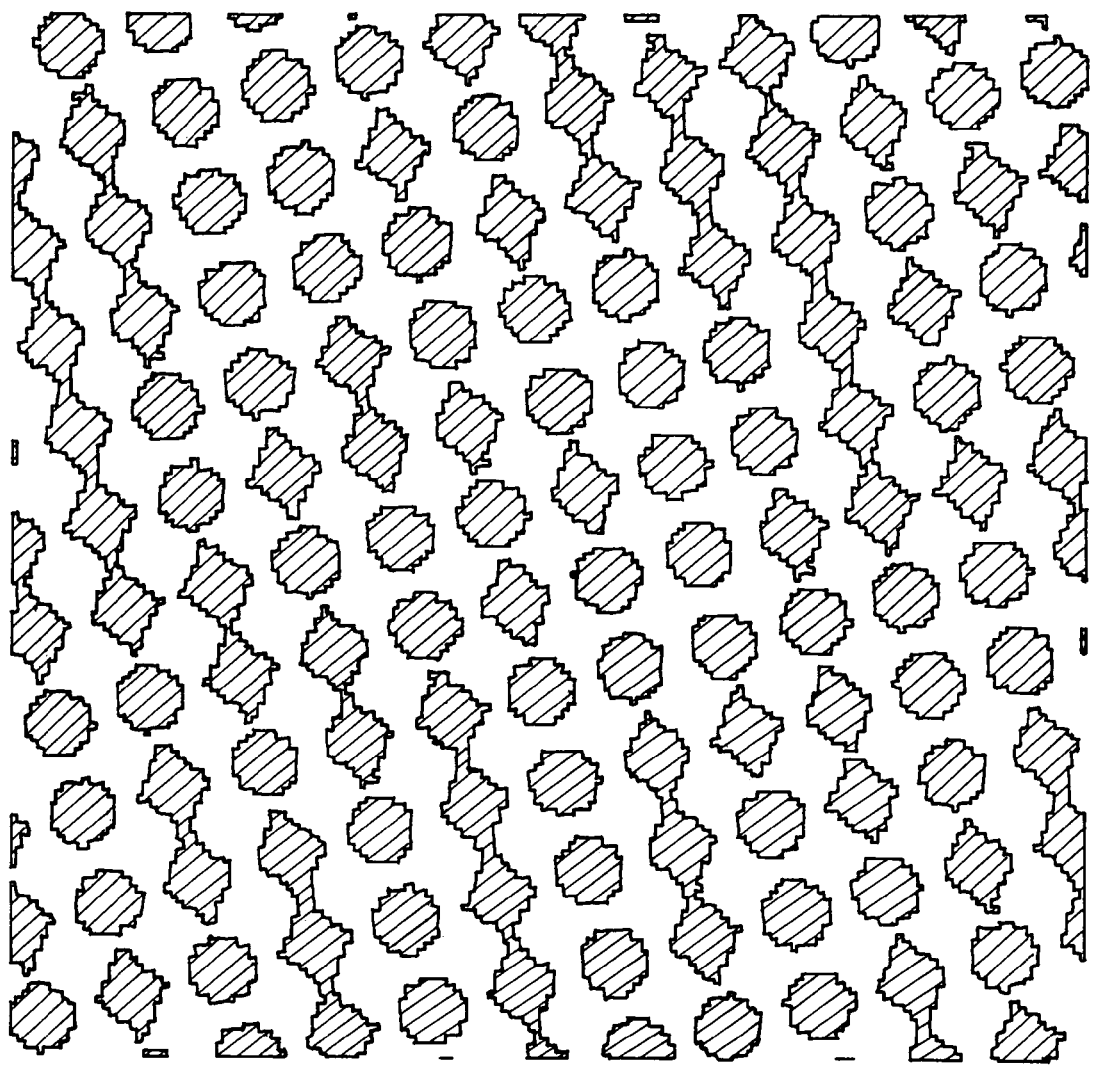
FIG. 17 is a view showing a distribution of a dot pattern wherein mean dot % is 41% in the event that pixel values are varied uniformly using the method explained referring to FIG. 16.
Figure 18:
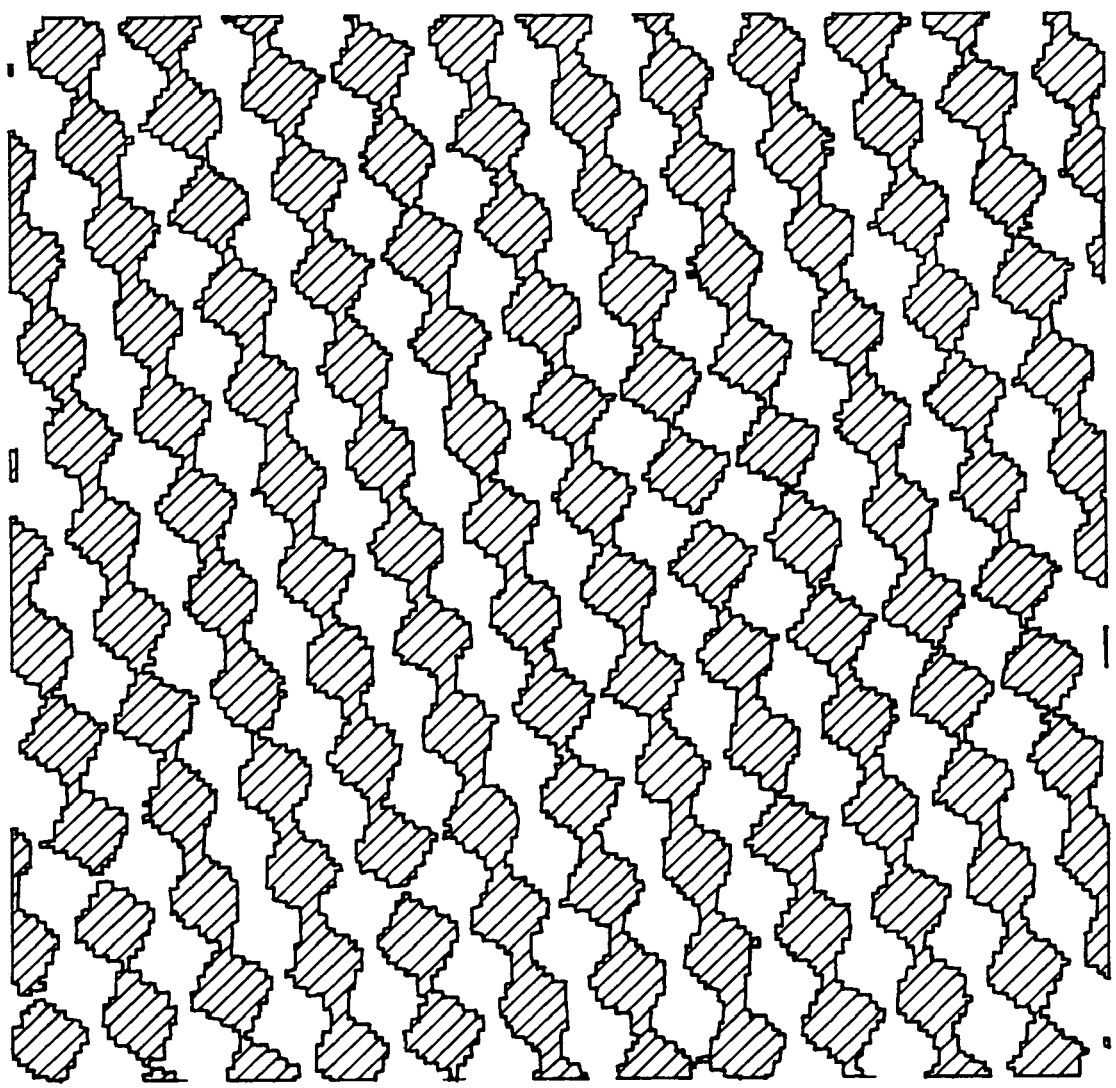
FIG. 18 is a view showing a distribution of a dot pattern wherein mean dot % is 50% in the event that pixel values are varied uniformly using the method explained referring to FIG. 16.
Figure 19:
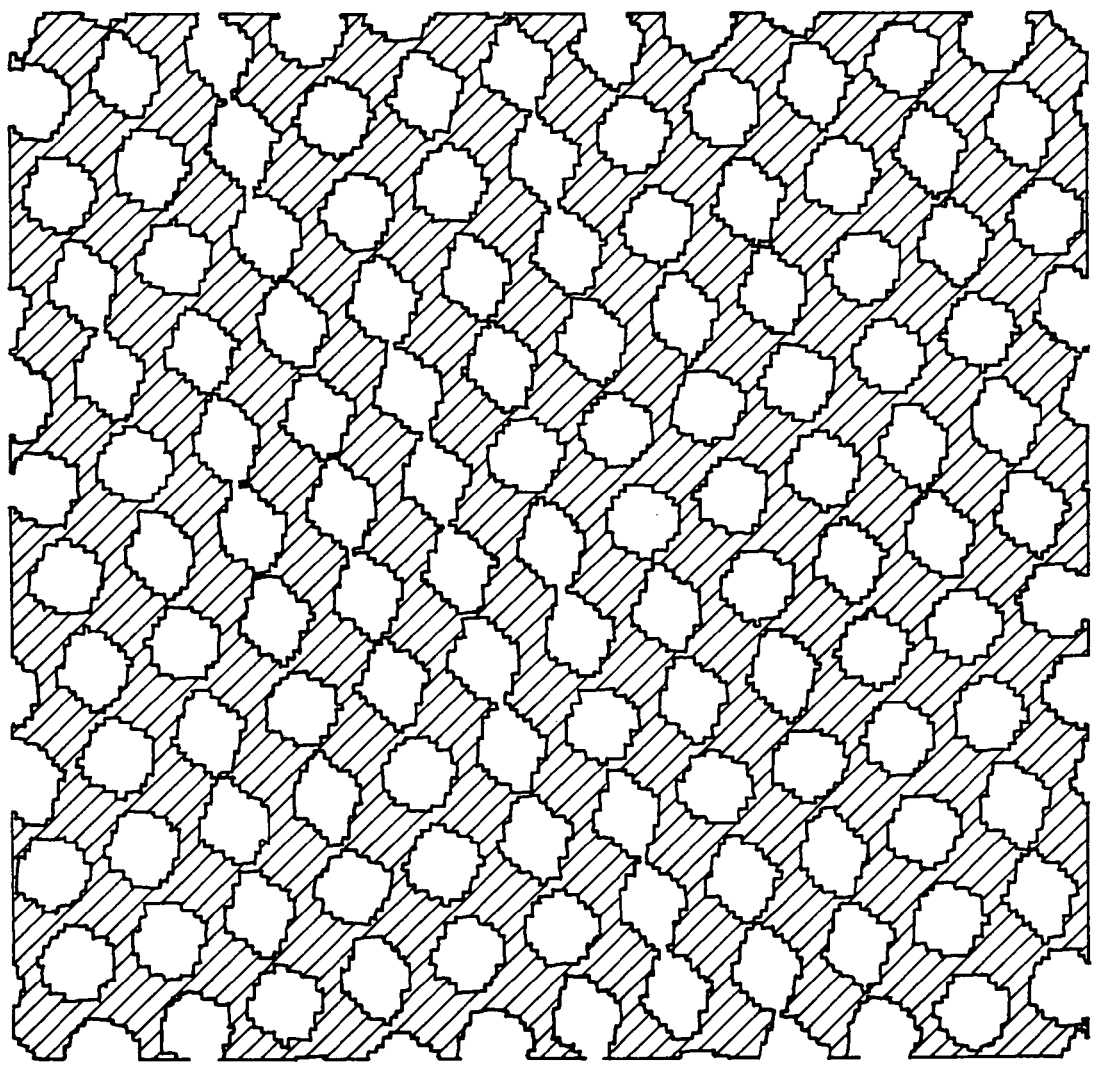
FIG. 19 is a view showing a distribution of a dot pattern wherein mean dot % is 55% in the event that pixel values are varied uniformly using the method explained referring to FIG. 16.

FIGS. 17–19 are views each showing a distribution of a dot pattern of respective mean dot % in the event that pixel values are varied uniformly using the method explained referring to FIG. 16.

Also in those figures, the shaded portions denote dot patterns. Here, there is used such a method that pixel values of pixels of an image are converted using a super pixel wherein there are arranged a plurality of basic patterns for forming dot patterns, which grow while maintaining the same dot % and are mutually different with respect to the shape in at least part of dot % range, in the event that processing for a conversion of pixel values into dot patterns is repeated while pixel values on the image are sequentially varied from the lower density end to the higher density end uniformly.

FIGS. 17–19 show distributions of dot patterns of 41%, 51% and 55% in mean dot %, respectively.

As seen from those figures, similar to FIGS. 11–15, when the pixel values are varied from the lower density end to the higher density end, contacting points are gradually increased, but a plurality of dot patterns are not in contact with one another simultaneously at a large number of points.

FIGS. 20(a)–20(d) are illustrations each showing halftone dot images obtained using a printer capable of outputting a multi-values of halftone dot image. Here, similar to the above-mentioned explanation, there are shown variations of the dot patterns wherein pixel values on an image are sequentially varied from the lower density end to the higher density end.

Figure 20:
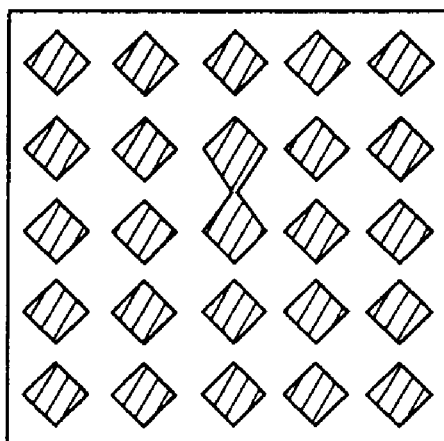
FIGS. 20(a)–20(d) are illustrations each showing halftone dot images obtained using a printer capable of outputting a multi-values of halftone dot image.
Figure 20:
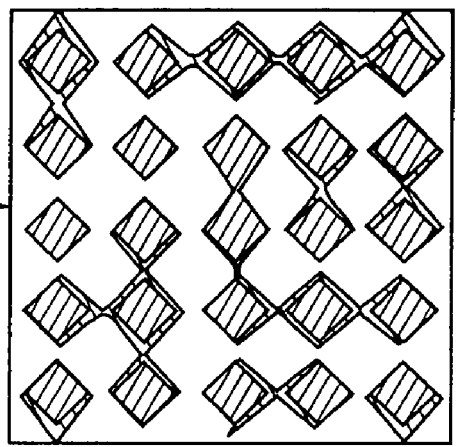
Figure 20:
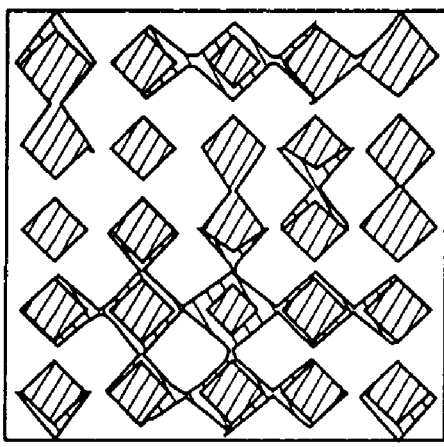
Figure 20:
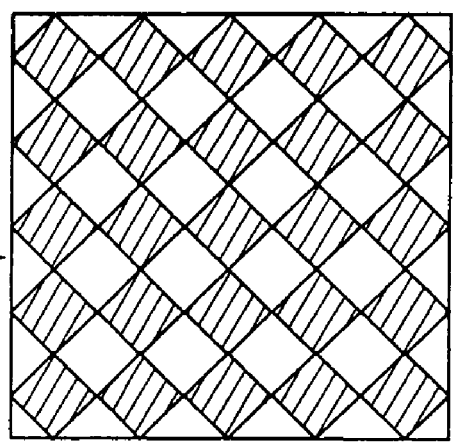

FIG. 20(a) shows a halftone dot image wherein an image, in which pixels each having a certain pixel value are arranged uniformly, is converted into dot patterns. FIGS. 20(b), 20(c) and 20(d) show halftone dot images, wherein images having pixel values little by little larger than the pixel value involved in FIG. 20(a) in the named order, respectively, are converted into dot patterns, respectively.

According to the explanation as to the above-mentioned embodiments, the explanation has been made on the assumption that the inside of the dot pattern has an even density. Here, however, there exist light and shade inside the dot pattern. Thus, the inside of the dot pattern is expressed by binary values of "light" and "shade", and in combination with the outside of the dot pattern, there is provided a ternary value of halftone dot pattern.

First, when the pixel value involved in the step of FIG. 20(a) is changed to a little larger pixel value, as shown in FIG. 20(b), outlines, which are thin in density, appear around the dot pattern of FIG. 20(a). When the pixel value is changed to a further just little larger pixel value, as shown in FIG. 20(c), the thin outlines are expanded, and when the pixel value is changed to a further more just little larger pixel value, as shown in FIG. 20(d), the thin outlines are increased in density, so that the original dot patterns are changed to dot patterns which are uniformly stronger in density. It is noted that in FIG. 20(d), as compared with FIG. 20(a), the dot patterns are larger in dot %.

Also in the event that such pixel value data is converted into halftone dot data representative of halftone dot image having multi-values more than binary values, it is preferable that in a similar fashion to that of conversion into the above-mentioned halftone dot data of the binary values, halftone patterns are adjusted in such a manner that when pixel values are gradually varied from the smaller value (lower density end) to the larger value (higher density end), the contact points of the dot patterns are gradually increased.

While the above-mentioned explanation does not refer to a method of determination as to whether the adjacent dot patterns are in contact with one another, it is acceptable that it is determined whether the adjacent dot patterns are in contact with one another on an image, or alternatively it is acceptable that it is determined whether the adjacent dot patterns are in contact with one another on a halftone dot image printed using, for example, the printing machine 40 shown in FIG. 1.

Figure 21:
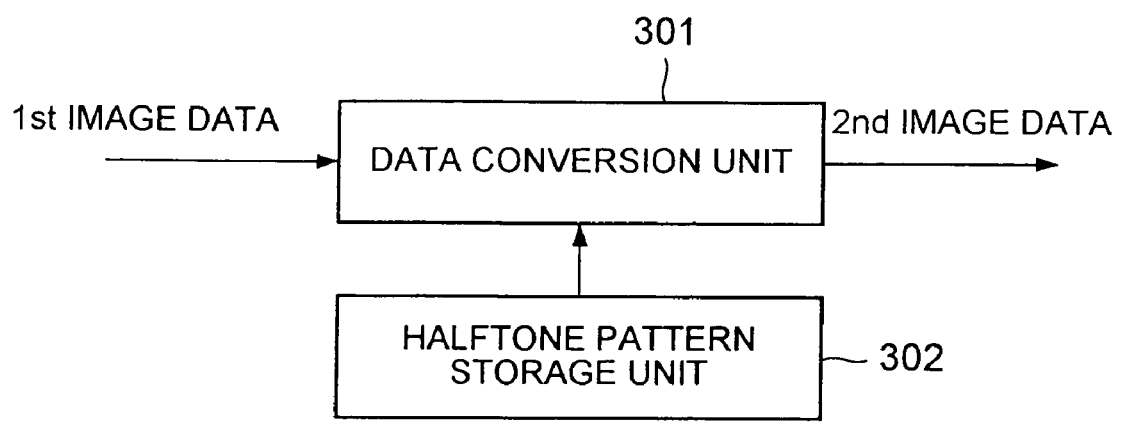
FIG. 21 is a functional block diagram of a first embodiment of an image processing apparatus according to the present invention.

FIG. 21 is a functional block diagram of a first embodiment of an image processing apparatus according to the present invention.

This image processing apparatus can be implemented by a combination of the personal computer 100 shown in FIGS. 4 and 5 and a program to be executed by the personal computer 100.

The image processing apparatus shown in FIG. 21 comprises a data conversion unit 301 and a halftone pattern storage unit 302. The halftone pattern storage unit 302 is set up inside of the hard disk 103. An aspect of the present embodiment resides in contents of storage of the halftone pattern storage unit 302. The halftone pattern storage unit 302 stores therein a super cell comprising a plurality of sorts of basic patterns generated from a sort of original basic pattern, as explained referring to FIGS. 9 and 10, or a super cell comprising originally a plurality of sorts of basic patterns, as explained referring to FIG. 16.

The data conversion unit 301 comprises the CPU 101 shown in FIG. 5 and programs to be executed by the CPU 101. The data conversion unit 301 serves to read the super cell stored in the halftone pattern storage unit 302, receive first image data (pixel value data) representative of pixel values of a plurality of pixels constituting an image, and convert the first image data into second image data (halftone dot data) representative of dot patterns of halftone dots. The second image data thus obtained is outputted to the film printer shown in FIG. 1. Thus, finally, it is possible to obtain a high quality of halftone dot image involving no occurrence of a tone jump or being not conspicuous in a tone jump.

Figure 22:
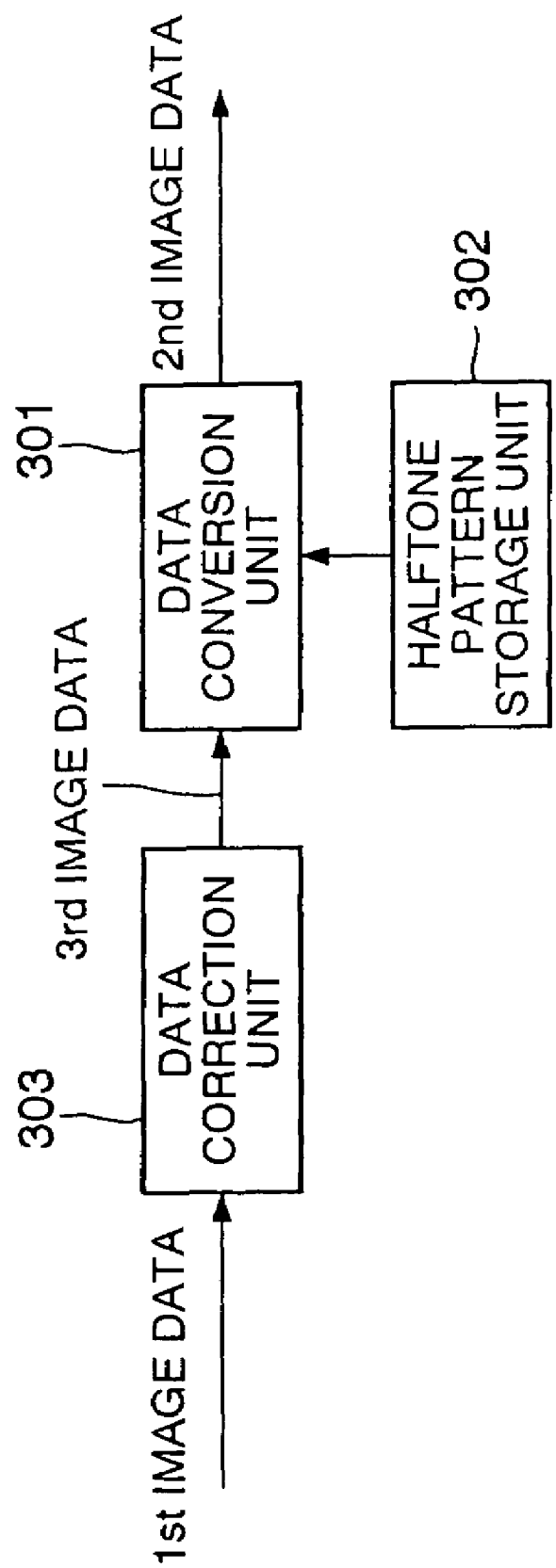
FIG. 22 is a functional block diagram of a second 25 embodiment of an image processing apparatus according to the present invention.

FIG. 22 is a functional block diagram of a second embodiment of an image processing apparatus according to the present invention.

This image processing apparatus shown in FIG. 22 can also be implemented, in a similar fashion to that of the image processing apparatus shown in FIG. 21, by a combination of the personal computer 100 shown in FIGS. 4 and 5 and a program to be executed by the personal computer 100.

The image processing apparatus shown in FIG. 22 comprises the data conversion unit 301 and the halftone pattern storage unit 302, which constitute the image processing apparatus shown in FIG. 21, and a data correction unit 303 as well. But the halftone pattern storage unit 302 of the image processing apparatus shown in FIG. 22 stores a super cell in which a sort of plural basic patterns are simply arranged, different from a super cell stored in the halftone pattern storage unit of the image processing apparatus shown in FIG. 21.

The operation of the data conversion unit 301 of the image processing apparatus shown in FIG. 22 is the same as that of the data conversion unit of the image processing apparatus shown in FIG. 21, but the super cell stored in the halftone pattern storage unit 302 of the image processing apparatus shown in FIG. 22 is a super cell in which only a sort of plural basic patterns are simply arranged. Thus, in the event that the data correction unit 303 does not exist, the change of the pixel value brings about a simultaneous connection of a large number of contact points, and thus there is a possibility that the halftone dot image is conspicuous in tone jump.

For this reason, the image processing apparatus shown in FIG. 22 is provided with the data correction unit 303. The data correction unit 303 corrects pixel values within a plurality of image areas for each unit into a plurality of patterns taking an image area to be compared with one dot cell as a unit. That is, according to the image processing apparatus shown in FIG. 22, instead of preparation of the super cell in which a plurality of sorts of dot cells are combined, the first image data (pixel value data) is corrected into a plurality of patterns. Further, in other words, a comparison of a pixel value with a threshold of the dot cell is a relative one, and thus instead of preparation of a plurality of sorts of dot cells subjected to alteration of thresholds of the dot cells, according to the present embodiment, a sort of dot cells are given, and pixel values are corrected and compared with thresholds of the dot cells.

In this manner, the data correction unit 303 performs an arithmetic operation between pixel values of pixels on an image represented by the entered first image data and correction values of a correction pattern comprising an arrangement of correction values, which are mutually superimposed, in the event that the correction pattern is superimposed on the image, to correct the pixel values of the respective pixels on the image, so that there is executed a data correction processing for generating third image data representative of pixel values after correction of a plurality of pixels constituting the image. To execute the data correction processing, there is used a correction pattern in which correction values are adjusted so as to obtain dot patterns wherein a first dot % of dot patterns, wherein mutually contacting dot patterns first appear with respect to the same direction on the image, in the event that the above-mentioned correction pattern is concerned with such a correction pattern that when a correction cell associated with one halftone dot is regarded as a unit, there are arranged a plurality of sorts of correction cells in which at least part of correction values arranged on the correction cell is different from among correction cells, and in addition in the event that the data conversion unit 301 repeatedly performs the data conversion processing while the pixel values of the pixels on the image are sequentially varied from the lower density end to the higher density end uniformly, is different from a second dot % of dot patterns wherein all the dot patterns, which are adjacent to one another with respect to the same direction, are in contact with one another. The correction pattern used in the present embodiment is concerned with a correction pattern in which correction values are adjusted in such a manner that mutually different dot patterns are obtained also as to the above-mentioned first dot %-to-first dot %.with respect to the mutually different direction, and the above-mentioned second dot %-to-second dot % with respect to the mutually different direction.

The data conversion unit 301 compares pixel values of pixels on an image represented by the third image data generated in the data correction unit 303 with a threshold of a super cell comprising an arrangement of a sort of dot cells, which are mutually superimposed, in the event that the super cell is superimposed on the image, to convert the pixel values of the respective pixels on the image into the binary values (or multi-values more than the binary values), so that there is executed a data conversion processing for generating second image data representative of dot patterns of the respective halftone dots.

Also in the event that the image processing apparatus shown in FIG. 22 is adopted, it is possible to obtain a high quality of halftone dot image involving no occurrence of a tone jump or being not conspicuous in a tone jump.

Incidentally, the above-mentioned various embodiments are involved in the printing system shown in FIG. 1 in which an image setter (or a film setter) is used by way of example. But the present invention is not restricted to the image setter, and is widely applicable to CTP (computer to plate), CTC (computer to cylinder), on-demand printing and the like.

Further, the above-mentioned various embodiments are concerned with an example adopting a halftone dot processing in which pixel values on the image are compared with thresholds of the halftone pattern so that dot patterns of halftone dots are produced. But the present invention is not restricted to ones for performing a so-called threshold type of halftone dot processing. Any one is acceptable, as the present invention, which performs a halftone dot processing in which a first dot % of dot patterns, wherein mutually contacting dot patterns first appear with respect to the same direction on the image, in the event that the halftone dot processing is repeatedly performed while the pixel values of the pixels on the image are sequentially varied from the lower density end to the higher density end uniformly, is different from a second dot % of dot patterns wherein all the dot patterns, which are adjacent to one another with respect to the same direction.

As mentioned above, according to the present invention, it is possible to obtain image data representative of a high quality of halftone dot image free from a tone jump or being not conspicuous in a tone jump.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An image processing method of performing a halftone dot processing in which first image data representative of pixel values of a plurality of pixels constituting an image is converted into second image data representative of dot patterns of halftone dots, wherein said image processing method performs the halftone dot processing in which a first dot % of dot patterns, wherein mutually contacting dot patterns first appear with respect to an identical direction on the image, in the event that the halftone dot processing is repeatedly performed while pixel values of pixels on an image comprising a plurality of pixels all of which are same in pixel value are sequentially varied from a lower density end to a higher density end uniformly, is different from a second dot % of dot patterns wherein all the dot patterns, which are adjacent to one another with respect to the identical direction, are in contact with one another, and wherein said first image data is converted into second image data by comparing said pixel values with thresholds of a halftone pattern comprising an arrangement of thresholds, said thresholds of a halftone pattern further comprising a plurality of basic patterns which thresholds are adjusted such that dot patterns are formed which are identical to each other in growth process in respect to shape, but are mutually different from one another in degree of growth.

2. An image processing method according to claim 1, wherein said halftone dot processing is a process for comparing pixel values of pixels on an image represented by the first image data with thresholds of a halftone pattern comprising an arrangement of thresholds, which are mutually superimposed, in the event that the halftone pattern is superimposed on the image, to convert the pixel values of the respective pixels on the image into binary values or multi-values more than the binary values, and said halftone dot processing is performed using a halftone pattern in which thresholds are adjusted in such a manner that the first dot % regarding a same direction on the image is different from the second dot %, said halftone pattern being concerned with such a pattern that when a dot cell associated with one halftone dot is regarded as a unit, there are arranged a plurality of sorts of dot cells in which at least part of threshold arranged on the dot cells are relatively different from pixel values on an image area on which the dot cells are superimposed.

3. An image processing method according to claim 2, wherein said halftone dot processing is performed using a halftone pattern in which there are arranged a plurality of sorts of dot cells for forming dot patterns, which are identical with one another in growth process with respect to the shape and are different from one another in degree of growth in at least part of mean dot % range, in the event that the halftone dot processing is repeated while pixel values on the image are sequentially varied from the lower density end to the higher density end uniformly.

4. An image processing method according to claim 2, wherein said halftone dot processing is performed using a halftone pattern in which there are arranged a plurality of sorts of dot cells for forming dot patterns, which grow while maintaining the same dot % and are mutually different with respect to the shape in at least part of dot % range, in the event that the halftone dot processing is repeated while pixel values on the image are sequentially varied from the lower density end to the higher density end uniformly.

5. An image processing method according to claim 2, wherein said halftone dot processing is performed using a halftone pattern in which there are arranged a plurality of sorts of dot cells wherein there are arranged thresholds which are relatively adjusted to pixel values of the image area to be superimposed in such a manner that a difference between minimum dot % of the first dot % regarding mutually different directions and maximum dot % of the second dot % regarding mutually different directions is not less than 1%.

6. An image processing method according to claim 1, wherein said halftone dot processing is performed in such a manner that the first dot % of dot patterns, wherein mutually contacting dot patterns first appear with respect to an identical direction on the image, in the event that the halftone dot processing is repeatedly performed while pixel values of pixels on an image comprising a plurality of pixels all of which are same in pixel value are sequentially varied from a lower density end to a higher density end uniformly, is different from the second dot % of dot patterns wherein all the dot patterns, which are adjacent to one another with respect to the identical direction, are in contact with one another, and further the first dot %-to-first dot % with respect to the mutually different direction, and the second dot %-to-second dot % with respect to the mutually different direction are mutually different, respectively.

7. An image processing method according to claim 6, wherein said halftone dot processing is a process for comparing pixel values of pixels on an image represented by the first image data with thresholds of a halftone pattern comprising an arrangement of thresholds, which are mutually superimposed, in the event that the halftone pattern is superimposed on the image, to convert the pixel values of the respective pixels on the image into binary values or multi-values more than the binary values, and said halftone dot processing is performed using a halftone pattern in which thresholds are adjusted in such a manner that the first dot %-to-first dot % with respect to the mutually different direction, and the second dot %-to-second dot % with respect to the mutually different direction are mutually different, respectively, said halftone pattern being concerned with such a pattern that when a dot cell associated with one halftone dot is regarded as a unit, there are arranged a plurality of sorts of dot cells in which at least part of thresholds arranged on the dot cells are relatively different from pixel values on an image area on which the dot cells are superimposed.

8. An image processing method according to claim 7, wherein said halftone dot processing is performed using a halftone pattern in which there are arranged a plurality of sorts of dot cells for forming dot patterns, which are identical with one another in growth process with respect to the shape and are different from one another in degree of growth in at least part of mean dot % range, in the event that the halftone dot processing is repeated while pixel values on the image are sequentially varied from the lower density end to the higher density end uniformly.

9. An image processing method according to claim 7, wherein said halftone dot processing is performed using a halftone pattern in which there are arranged a plurality of sorts of dot cells for forming dot patterns, which grow while maintaining the same dot % and are mutually different with respect to the shape in at least part of dot % range, in the event that the halftone dot processing is repeated while pixel values on the image are sequentially varied from the lower density end to the higher density end uniformly.

10. An image processing method according to claim 7, wherein said halftone dot processing is performed using a halftone pattern in which there are arranged a plurality of sorts of dot cells wherein there are arranged thresholds which are relatively adjusted to pixel values of the image area to be superimposed in such a manner that a difference between minimum dot % of the first dot % regarding mutually different directions and maximum dot % of the second dot % regarding mutually different directions is not less than 1%.

11. An image processing apparatus for performing a halftone dot processing in which first image data representative of pixel values of a plurality of pixels constituting an image is converted into second image data representative of dot patterns of halftone dots, said image processing apparatus comprising:

a data conversion unit for comparing pixel values of pixels on an image represented by said first image data with a threshold of halftone patterns comprising an arrangement of thresholds, which are mutually superimposed, in the event that the halftone patterns are superimposed on the image, to convert the pixel values of the respective pixels on the image into multi-values not less than binary values, so that the second image data representative of dot patterns of the respective halftone dots is produced; and a halftone pattern storage unit for storing the halftone patterns in which thresholds are adjusted so as to obtain dot patterns wherein a first dot % of dot patterns, wherein mutually contacting dot patterns first appear with respect to the same direction on the image, in the event that the halftone pattern is concerned with such a halftone pattern that when a dot cell associated with one halftone dot is regarded as a unit, there are arranged a plurality of sorts of dot cells in which at least part of thresholds arranged on the dot cell is different from among dot cells, and in addition in the event that the data conversion unit repeatedly performs the data conversion processing, using the halftone patterns, while the pixel values of the pixels on the image comprising a plurality of pixels all of which are same in pixel value are sequentially varied from the lower density end to the higher density end uniformly, is different from a second dot % of dot patterns wherein all the dot patterns, which are adjacent to one another with respect to the same direction, are in contact with one another, wherein said data conversion unit performs the data conversion processing using the halftone patterns stored in said halftone pattern storage unit, and wherein said threshold of halftone patterns further comprises a plurality of basic patterns which thresholds are adjusted such that dot patterns formed are identical to each other in growth process in respect to shape, but are mutually different from one another in degree of growth.

12. An image processing apparatus according to claim 11, wherein said halftone pattern storage unit stores the halftone patterns in which thresholds are adjusted so as to obtain dot patterns wherein a first dot % of dot patterns, wherein mutually contacting dot patterns first appear with respect to the same direction on the image, in the event that the halftone pattern is concerned with such a halftone pattern that when a dot cell associated with one halftone dot is regarded as a unit, there are arranged a plurality of sorts of dot cells in which at least part of thresholds arranged on the dot cell is different from among dot cells, and in addition in the event that the data conversion unit repeatedly performs the data conversion processing, using the halftone patterns, while the pixel values of the pixels on the image comprising a plurality of pixels all of which are same in pixel value are sequentially varied from the lower density end to the higher density end uniformly, is different from a second dot % of dot patterns wherein all the dot patterns, which are adjacent to one another with respect to the same direction, are in contact with one another, said halftone patterns being a pattern in which thresholds are adjusted in such a manner that mutually different dot patterns are obtained as to the first dot %-to-first dot % with respect to the mutually different direction, and as to the second dot %-to-second dot % with respect to the mutually different direction.

13. An image processing apparatus for performing a halftone dot processing in which first image data representative of pixel values of a plurality of pixels constituting an image is converted into second image data representative of dot patterns of halftone dots, said image processing apparatus comprising:

a data correction unit for performing an arithmetic operation between pixel values of pixels on an image represented by said first image data and correction values of a correction pattern comprising an arrangement of correction values, which are mutually superimposed, in the event that the correction pattern is superimposed on the on the image, so that there is executed a data correction processing for generating third image data representative of pixel values after correction of a plurality of pixels constituting the image; and a data conversion unit for comparing pixel values of pixels on an image represented by the third image data generated in said data correction unit with a threshold of a halftone pattern comprising an arrangement of thresholds, which are mutually superimposed, in the event that the halftone pattern is superimposed on the image, to convert the pixel values of the respective pixels on the image into multi-values not less than binary values, so that second image data representative of dot patterns of the respective halftone dots is generated, wherein said data conversion unit performs the data correction processing using a correction pattern in which correction values are adjusted so as to obtain dot patterns wherein a first dot % of dot patterns, wherein mutually contacting dot patterns first appear with respect to the same direction on the image, in the event that the correction pattern is concerned with such a correction pattern that when a correction cell associated with one halftone dot is regarded as a unit, there are arranged a plurality of sorts of correction cells in which at least part of correction values arranged on the correction cell is different from among correction cells, and in addition in the event that the data correction processing by said data correction unit and the data conversion processing by said data conversion unit are repeatedly performed while the pixel values of the pixels on the image comprising a plurality of pixels all of which are same in pixel value are sequentially varied from the lower density end to the higher density end uniformly, is different from a second dot % of dot patterns wherein all the dot patterns, which are adjacent to one another with respect to the same direction, are in contact with one another.

14. An image processing apparatus according to claim 13, wherein said data conversion unit performs the data correction processing using a correction pattern in which correction values are adjusted so as to obtain dot patterns wherein a first dot % of dot patterns, wherein mutually contacting dot patterns first appear with respect to the same direction on the image, in the event that the correction pattern is concerned with such a correction pattern that when a correction cell associated with one halftone dot is regarded as a unit, there are arranged a plurality of sorts of correction cells in which at least part of correction values arranged on the correction cell is different from among correction cells, and in addition in the event that the data correction processing by said data correction unit and the data conversion processing by said data conversion unit are repeatedly performed while the pixel values of the pixels on the image comprising a plurality of pixels all of which are same in pixel value are sequentially varied from the lower density end to the higher density end uniformly, is different from a second dot % of dot patterns wherein all the dot patterns, which are adjacent to one another with respect to the same direction, are in contact with one another, said correction pattern being a pattern in which correction values are adjusted in such a manner that mutually different dot patterns are obtained also as to the first dot %-to-first dot % with respect to the mutually different direction, and the second dot %-to-second dot % with respect to the mutually different direction.

15. An image processing method of performing a halftone dot processing in which first image data representative of pixel values of a plurality of pixels constituting an image is converted into second image data representative of dot patterns of halftone dots, wherein said image processing method performs the halftone dot processing in which a first dot % of dot patterns, wherein mutually contacting dot patterns first appear with respect to an identical direction on the image, in the event that the halftone dot processing is repeatedly performed while pixel values of pixels on an image comprising a plurality of pixels all of which are same in pixel value are sequentially varied from a lower density end to a higher density end uniformly, is different from a second dot % of dot patterns wherein all the dot patterns, which are adjacent to one another with respect to the identical direction, are in contact with one another, wherein said halftone dot processing is performed using a halftone pattern in which there are arranged a plurality of sorts of dot cells for forming dot patterns, which grow while maintaining the same dot % and are mutually different with respect to the shape in at least part of dot % range, in the event that the halftone dot processing is repeated while pixel values on the image are sequentially varied from the lower density end to the higher density end uniformly.

16. An image processing method according to claim 15, wherein said halftone dot processing is a process for comparing pixel values of pixels on an image represented by the first image data with thresholds of a halftone pattern comprising an arrangement of thresholds, which are mutually superimposed, in the event that the halftone pattern is superimposed on the image, to convert the pixel values of the respective pixels on the image into binary values or multi-values more than the binary values, and said halftone dot processing is performed using a halftone pattern in which thresholds are adjusted in such a manner that the first dot % regarding a same direction on the image is different from the second dot %, said halftone pattern being concerned with such a pattern that when a dot cell associated with one halftone dot is regarded as a unit, there are arranged a plurality of sorts of dot cells in which at least part of threshold arranged on the dot cells are relatively different from pixel values on an image area on which the dot cells are superimposed.

17. An image processing method according to claim 16, wherein said halftone dot processing is performed using a halftone pattern in which there are arranged a plurality of sorts of dot cells for forming dot patterns, which are identical with one another in growth process with respect to the shape and are different from one another in degree of growth in at least part of mean dot % range, in the event that the halftone dot processing is repeated while pixel values on the image are sequentially varied from the lower density end to the higher density end uniformly.

18. An image processing method according to claim 16, wherein said halftone dot processing is performed using a halftone pattern in which there are arranged a plurality of sorts of dot cells for forming dot patterns, which grow while maintaining the same dot % and are mutually different with respect to the shape in at least part of dot % range, in the event that the halftone dot processing is repeated while pixel values on the image are sequentially varied from the lower density end to the higher density end uniformly.

19. An image processing method according to claim 16, wherein said halftone dot processing is performed using a halftone pattern in which there are arranged a plurality of sorts of dot cells wherein there are arranged thresholds which are relatively adjusted to pixel values of the image area to be superimposed in such a manner that a difference between minimum dot % of the first dot % regarding mutually different directions and maximum dot % of the second dot % regarding mutually different directions is not less than 1%.

20. An image processing method according to claim 15, wherein said halftone dot processing is performed in such a manner that the first dot % of dot patterns, wherein mutually contacting dot patterns first appear with respect to an identical direction on the image, in the event that the halftone dot processing is repeatedly performed while pixel values of pixels on an image comprising a plurality of pixels all of which are same in pixel value are sequentially varied from a lower density end to a higher density end uniformly, is different from the second dot % of dot patterns wherein all the dot patterns, which are adjacent to one another with respect to the identical direction, are in contact with one another, and further the first dot %-to-first dot % with respect to the mutually different direction, and the second dot %-to-second dot % with respect to the mutually different direction are mutually different, respectively.

21. An image processing method according to claim 20, wherein said halftone dot processing is a process for comparing pixel values of pixels on an image represented by the first image data with thresholds of a halftone pattern comprising an arrangement of thresholds, which are mutually superimposed, in the event that the halftone pattern is superimposed on the image, to convert the pixel values of the respective pixels on the image into binary values or multi- values more than the binary values, and said halftone dot processing is performed using a halftone pattern in which thresholds are adjusted in such a manner that the first dot %-to-first dot % with respect to the mutually different direction, and the second dot %-to-second dot % with respect to the mutually different direction are mutually different, respectively, said halftone pattern being concerned with such a pattern that when a dot cell associated with one halftone dot is regarded as a unit, there are arranged a plurality of sorts of dot cells in which at least part of thresholds arranged on the dot cells are relatively different from pixel values on an image area on which the dot cells are superimposed.

22. An image processing method according to claim 20, wherein said halftone dot processing is performed using a halftone pattern in which there are arranged a plurality of sorts of dot cells for forming dot patterns, which are identical with one another in growth process with respect to the shape and are different from one another in degree of growth in at least part of mean dot % range, in the event that the halftone dot processing is repeated while pixel values on the image are sequentially varied from the lower density end to the higher density end uniformly.

23. An image processing method according to claim 21, wherein said halftone dot processing is performed using a halftone pattern in which there are arranged a plurality of sorts of dot cells wherein there are arranged thresholds which are relatively adjusted to pixel values of the image area to be superimposed in such a manner that a difference between minimum dot % of the first dot % regarding mutually different directions and maximum dot % of the second dot % regarding mutually different directions is not less than 1%.

24. An image processing apparatus for performing a halftone dot processing in which first image data representative of pixel values of a plurality of pixels constituting an image is converted into second image data representative of dot patterns of halftone dots, said image processing apparatus comprising:
- a data conversion unit for comparing pixel values of pixels on an image represented by said first image data with a threshold of halftone patterns comprising an arrangement of thresholds, which are mutually superimposed, in the event that the halftone patterns are superimposed on the image, to convert the pixel values of the respective pixels on the image into multi-values not less than binary values, so that the second image data representative of dot patterns of the respective halftone dots is produced; and
- a halftone pattern storage unit for storing the halftone patterns in which thresholds are adjusted so as to obtain dot patterns wherein a first dot % of dot patterns, wherein mutually contacting dot patterns first appear with respect to the same direction on the image, in the event that the halftone pattern is concerned with such a halftone pattern that when a dot cell associated with one halftone dot is regarded as a unit, there are arranged a plurality of sorts of dot cells in which at least part of thresholds arranged on the dot cell is different from among dot cells, and in addition in the event that the data conversion unit repeatedly performs the data conversion processing, using the halftone patterns, while the pixel values of the pixels on the image comprising a plurality of pixels all of which are same in pixel value are sequentially varied from the lower density end to the higher density end uniformly, is different from a second dot % of dot patterns wherein all the dot patterns, which are adjacent to one another with respect to the same direction, are in contact with one another, wherein said data conversion unit performs the data conversion processing using the halftone patterns stored in said halftone pattern storage unit, and wherein said halftone dot processing is performed using a halftone pattern in which there are arranged a plurality of sorts of dot cells for forming dot patterns, which grow while maintaining the same dot % and are mutually different with respect to the shape in at least part of dot % range, in the event that the halftone dot processing is repeated while pixel values on the image are sequentially varied from the lower density end to the higher density end uniformly.

25. An image processing apparatus according to claim 24, wherein said halftone pattern storage unit stores the halftone patterns in which thresholds are adjusted so as to obtain dot patterns wherein a first dot % of dot patterns, wherein mutually contacting dot patterns first appear with respect to the same direction on the image, in the event that the halftone pattern is concerned with such a halftone pattern that when a dot cell associated with one halftone dot is regarded as a unit, there are arranged a plurality of sorts of dot cells in which at least part of thresholds arranged on the dot cell is different from among dot cells, and in addition in the event that the data conversion unit repeatedly performs the data conversion processing, using the halftone patterns, while the pixel values of the pixels on the image comprising a plurality of pixels all of which are same in pixel value are sequentially varied from the lower density end to the higher density end uniformly, is different from a second dot % of dot patterns wherein all the dot patterns, which are adjacent to one another with respect to the same direction, are in contact with one another, said halftone patterns being a pattern in which thresholds are adjusted in such a manner that mutually different dot patterns are obtained as to the first dot %-to-first dot % with respect to the mutually different direction, and as to the second dot %-to-second dot % with respect to the mutually different direction.

* * * * *